United States Patent
Ye et al.

(10) Patent No.: US 12,267,267 B2
(45) Date of Patent: Apr. 1, 2025

(54) POSITION DETERMINATION METHOD FOR REFERENCE SIGNAL, COMMUNICATION NODE, AND STORAGE MEDIUM

(71) Applicant: ZTE Corporation, Guangdong (CN)

(72) Inventors: Xinquan Ye, Guangdong (CN);
Chuangxin Jiang, Guangdong (CN);
Zhaohua Lu, Guangdong (CN);
Shujuan Zhang, Guangdong (CN);
Huahua Xiao, Guangdong (CN); Yijian Chen, Guangdong (CN)

(73) Assignee: ZTE Corporation, Shenzhen (CN)

( * ) Notice: Subject to any disclaimer, the term of this patent is extended or adjusted under 35 U.S.C. 154(b) by 368 days.

(21) Appl. No.: 17/775,286

(22) PCT Filed: Nov. 5, 2020

(86) PCT No.: PCT/CN2020/126706
§ 371 (c)(1),
(2) Date: May 7, 2022

(87) PCT Pub. No.: WO2021/088917
PCT Pub. Date: May 14, 2021

(65) Prior Publication Data
US 2022/0407651 A1     Dec. 22, 2022

(30) Foreign Application Priority Data
Nov. 8, 2019   (CN) .......................... 201911090418.5

(51) Int. Cl.
*H04W 4/00*     (2018.01)
*H04L 5/00*     (2006.01)
(52) U.S. Cl.
CPC .......... *H04L 5/0048* (2013.01); *H04L 5/0094* (2013.01)

(58) Field of Classification Search
CPC ... H04L 5/0048; H04L 5/0094; H04L 5/0023; H04L 5/0051; H04L 5/005; H04L 5/0053
See application file for complete search history.

(56) References Cited

U.S. PATENT DOCUMENTS

| | | | |
|---|---|---|---|
| 2019/0165910 A1 | 5/2019 | Lee et al. | |
| 2019/0305908 A1 | 10/2019 | Lee et al. | |
| 2022/0407651 A1* | 12/2022 | Ye | .......................... H04L 5/005 |

FOREIGN PATENT DOCUMENTS

| | | | | |
|---|---|---|---|---|
| CA | 3042828 A1 * | 5/2018 | .......... | H04B 7/0404 |
| CA | 3070553 A1 * | 10/2019 | .......... | H04L 1/0008 |

(Continued)

OTHER PUBLICATIONS

Extended European Search Report dated Nov. 8, 2023, in connection with European Application No. 20884336.7.

(Continued)

*Primary Examiner* — Thai Dinh Hoang
(74) *Attorney, Agent, or Firm* — Wolf, Greenfield & Sacks, P.C.

(57) ABSTRACT

Provided are a position determination method and device for a reference signal, a communication node and a storage medium. The position determination method for a reference signal includes acquiring indication information; and determining the frequency domain position of a first PTRS and the frequency domain position of a second PTRS according to the indication information and a predefined mapping relationship. The predefined mapping relationship indicates a mapping relationship between the indication information and the frequency domain position of the first PTRS and a mapping relationship between the indication information and the frequency domain position of the second PTRS.

20 Claims, 4 Drawing Sheets

(56) References Cited

FOREIGN PATENT DOCUMENTS

| | | | |
|---|---|---|---|
| CN | 108111272 A | 6/2018 | |
| CN | 108111282 A | 6/2018 | |
| CN | 108400855 A | 8/2018 | |
| CN | 108632005 A | 10/2018 | |
| CN | 109039965 A | 12/2018 | |
| CN | 109151979 A | 1/2019 | |
| CN | 109391448 A | 2/2019 | |
| CN | 109474398 A | 3/2019 | |
| CN | 109802796 A | 5/2019 | |
| CN | 109803404 A | 5/2019 | |
| CN | 111092711 A | 5/2020 | |
| EP | 4135452 A1 * | 2/2023 | ............ H04L 5/001 |
| WO | WO 2018/064313 A1 | 4/2018 | |
| WO | WO-2018204756 A1 * | 11/2018 | ......... H04B 10/6165 |
| WO | WO-2024178333 A1 * | 8/2024 | ........... H04L 5/0051 |

OTHER PUBLICATIONS

Chinese Search Report dated Oct. 13, 2023, in connection with Chinese Application No. 201911090418.5.
Chinese Office Action dated Oct. 17, 2023, in connection with Chinese Application No. 201911090418.5.
International Search Report mailed Feb. 5, 2021 in connection with International Application No. PCT/CN2020/126706.
[No Author Listed], Enhancements on multi-TRP/panel transmission. LG Electronics. 3GPP TSG RAN WG1 Meeting #98bis R1-1910582. Oct. 14-20, 2019. 23 pages.

\* cited by examiner

POSITION DETERMINATION METHOD FOR REFERENCE SIGNAL, COMMUNICATION NODE, AND STORAGE MEDIUM

CROSS-REFERENCE TO RELATED APPLICATIONS

This is a National Stage Application filed under 35 U.S.C. 371 based on International Patent Application No. PCT/CN2020/126706, filed on Nov. 5, 2020, which claims priority to Chinese Patent application Ser. No. 201911090418.5 filed on Nov. 8, 2019, disclosures of both of which are incorporated herein by reference in their entireties.

TECHNICAL FIELD

The present application relates to the field of communications, for example, a position determination method and device for a reference signal, a communication node and a storage medium.

BACKGROUND

The New Radio (NR) access technology supports multiple transmission and reception points (multi-TRP) to improve transmission effectiveness.

The presence of noise in a multi-TRP scenario, especially phase noise at high frequencies, affects the communication quality. To eliminate the influence of phase noise, a new phase tracking reference signal (PTRS) is introduced in NR, but the position configuration of PTRS resources in multi-TRP is to be determined.

SUMMARY

The present application relates to the field of communications, for example, a position determination method for a reference signal, a communication node and a storage medium.

An embodiment of the present application provides a position determination method for a reference signal. The method includes acquiring indication information; and determining the frequency domain position of a first PTRS and the frequency domain position of a second PTRS according to the indication information and a predefined mapping relationship. The predefined mapping relationship indicates a mapping relationship between the indication information and the frequency domain position of the first PTRS and a mapping relationship between the indication information and the frequency domain position of the second PTRS.

The frequency domain position of the first PTRS is the frequency domain position of a downlink PTRS indicated by first beam-related information or the frequency domain position of an uplink PTRS indicated by first beam-related information. The frequency domain position of the second PTRS is the frequency domain position of a downlink PTRS indicated by second beam-related information or the frequency domain position of an uplink PTRS indicated by second beam-related information. Beam-related information is transmission configuration indication or spatial relationship information.

An embodiment of the present application provides a position determination device for a reference signal. The device includes an acquisition module configured to acquire indication information; and a determination module configured to determine the frequency domain position of a first PTRS and the frequency domain position of a second PTRS according to the indication information and a predefined mapping relationship. The predefined mapping relationship indicates a mapping relationship between the indication information and the frequency domain position of the first PTRS and a mapping relationship between the indication information and the frequency domain position of the second PTRS.

The frequency domain position of the first PTRS is the frequency domain position of a downlink PTRS indicated by first beam-related information or the frequency domain position of an uplink PTRS indicated by first beam-related information. The frequency domain position of the second PTRS is the frequency domain position of a downlink PTRS indicated by second beam-related information or the frequency domain position of an uplink PTRS indicated by second beam-related information. Beam-related information is a transmission configuration indication or spatial relationship information.

An embodiment of the present application provides a communication node. The node includes one or more processors; and a storage device configured to store one or more programs.

When executed by the one or more processors, the one or more programs cause the one or more processors to perform the method provided in any embodiment of the present application.

An embodiment of the present application provides a storage medium storing a computer program. When the computer program is executed by a processor, the method provided in any embodiment of the present application is performed.

DETAILED DESCRIPTION

Embodiments of the present application are described hereinafter in detail in conjunction with drawings. It is to be noted that if not in collision, embodiments of the present application and features therein may be combined with each other in any manner.

The steps illustrated in the flowcharts among the drawings may be performed by, for example, a computer system capable of executing a set of computer-executable instructions. Moreover, although logical sequences are illustrated in the flowcharts, the steps illustrated or described may be performed in sequences different from those described here in some cases.

In this application, it is to be noted that, "sent by the first communication node" can be understood as "indicated by first beam-related information", and "sent by the second communication node" can be understood as "indicated by second beam-related information"; "received by the first communication node" can be understood as "indicated by first beam-related information", and "received by the second communication node" can be understood as "indicated by second beam-related information"; "downlink scheduling by the first communication node" can be understood as "downlink scheduling indicated by first beam-related information", and "downlink scheduling by the second communication node" can be understood as "downlink scheduling indicated by second beam-related information"; and "uplink scheduling by the first communication node" can be understood as "uplink scheduling indicated by first beam-related information", and "uplink scheduling by the second communication node" can be understood as "uplink scheduling indicated by second beam-related information".

Figure 1:
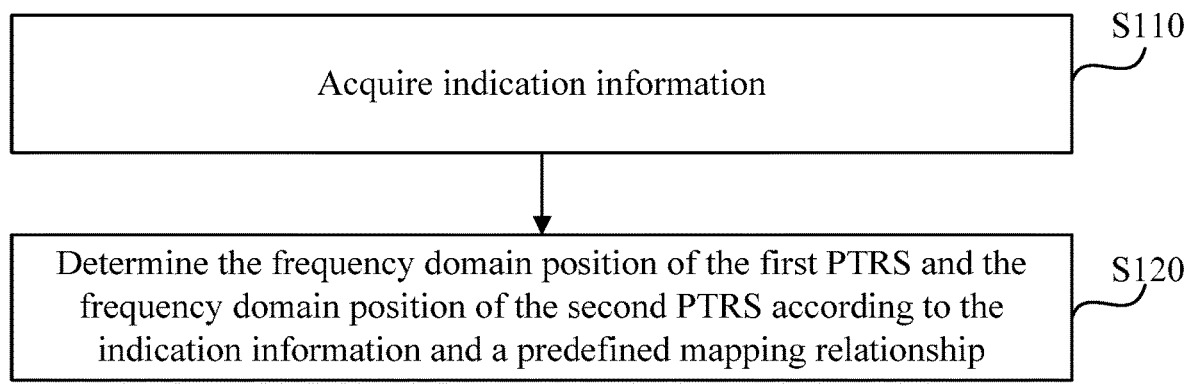
FIG. 1 is a flowchart of a position determination method for a reference signal according to an embodiment of the present application.

In an exemplary implementation, FIG. 1 is a flowchart of a position determination method for a reference signal according to an embodiment of the present application. This method can be applied to the situation of determining the position of PTRS resources in the multi-TRP scenario. This method may be executed by a position processing device for a reference signal. The position processing device for a reference signal may be performed by software and/or hardware and integrated on a communication node. The communication node may be any suitable type of user equipment (UE) or may be a base station, such as a first communication node.

A resource element (RE) is the smallest physical resource in NR and occupies one symbol in the time domain and one subcarrier in the frequency domain. A resource block (RB) consists of 12 consecutive subcarriers. Precoding resource group (PRG) represents RBs that are consecutive in the frequency domain and have the same precoding. The size of a PRG may be 2, 4, wideband.

PTRSs may be regarded as a supplement to demodulation reference signals (DMRSs) and used for eliminating the influence of phase noise. Part of the phase noise is due to crystal oscillators, especially at high frequencies. Whether a PTRS is configured may be determined by a base station, and the PTRS generally follows a DMRS. The PTRS frequency domain position is determined by three parameters: reference resource element, reference resource block and frequency domain density. The reference resource element is determined by the port number of the DMRS and the configuration type of the DMRS. The reference resource block is determined by the number of scheduled RBs, the PTRS density and the radio network temporary identifier (RNTI). The frequency domain density is determined by the number of scheduled RBs. Further, in one embodiment, the base station configures a mapping relationship between the frequency domain density and the number of RBs and agrees on the number of RBs in a specific range and the specific frequency domain density. The frequency domain density may be 2 or 4. The base station may not configure PTRS.

NR supports beam indication. The downlink beam indicates that the UE may receive the physical downlink shared channel (PDSCH) or physical downlink control channel (PDCCH) according to the beam of the previously configured reference signal. That is, the UE is informed that the base station uses the same spatial filter as the configured reference signal when sending PDSCHs or PDCCHs. In one embodiment, the beam indication is established on the transmission configuration indication (TCI). Each TCI state associates one or two downlink reference signals. The association relationship between reference signals is established through different quasi co-location types (QCL types).

The transmission occasion index may be understood as a transmission occasion identifier, that is ID. A PDSCH transmission occasion refers to the time domain position at which the UE transmits a PUSCH. The multi-TRP supports single downlink control indication information (S-DCI) to schedule two different physical downlink shared channels (PDSCHs). Since crystal oscillators of two TRPs are generally different, and phase noises of two TRPs are different, the existing R15 protocol does not specify how to determine time-frequency resource positions of PTRSs of two TRPs in the multi-TRP scenario. If the requirements of the relevant protocols are complied with, the PTRS only falls on the PRG of one of the TRPs, crystal oscillators of different TRPs are generally different, and phase noises of different TRPs are generally different so that the phase noise of another TRP cannot be estimated. To solve the preceding problems, it is necessary to determine resource positions of PTRSs in multi-TRP and the phase noise estimation method on different TRPs.

As shown in FIG. 1, the position determination method for a reference signal provided by the present application includes S110 and S120.

In S110, indication information is acquired.

The position determination method for a reference signal in the present application may be executed on the UE or may be executed on the first communication node. In the case of execution on the UE, the indication information may be the first communication node and sent to the UE. In the case of execution of the first communication node, the indication information is acquired.

The manner of obtaining the indication information is not limited herein, as long as the indication information can be obtained. For example, the indication information may be determined according to the specific content included in the indication information.

In one example, the indication information includes one or more of the following: the size of a first resource block; the size of a second resource block; the resource block index of a first PTRS; the resource block index of a second PTRS; the port number of a first DMRS; the port number of a second DMRS; the resource configuration type of the first DMRS; the resource configuration type of the second DMRS; a first transmission configuration indication; a second transmission configuration indication; first spatial relationship information; second spatial relationship information; radio network temporary identifier; the number of subcarriers in each resource block; the size of a precoding resource block group; a first transmission occasion index; a second transmission occasion index; the port number of a first PTRS; and the port number of a second PTRS.

The beam-related information is a transmission configuration indication or spatial relationship information. The beam-related information includes first beam-related information and second beam-related information. "First" and "second" may be used to distinguish. Exemplarily, "first" corresponds to the beam-related information of the first communication node. Moreover, "second" corresponds to the beam-related information of a second communication node.

The first transmission configuration indication, the second transmission configuration indication, the first spatial relationship information and the second spatial relationship information may be determined by a radio resource control (RRC) signaling, a media access control-control element (MAC-CE) signaling or a downlink control information (DCI) signaling.

The size of the first resource block is the size of a downlink scheduled resource block of the first communication node or the size of an uplink scheduled resource block of the first communication node. The size of the second resource block is the size of a downlink scheduled resource block of the second communication node or the size of an uplink scheduled resource block of the second communication node. The resource block index of the first PTRS is the resource block index of the first communication node sending a downlink PTRS or the resource block index of the first communication node receiving an uplink PTRS. The resource block index of the second PTRS is the resource block index of the second communication node sending a downlink PTRS or the resource block index of the second communication node receiving an uplink PTRS. The port number of the first DMRS is the port number of a downlink DMRS sent by the first communication node or the port number of an uplink DMRS received by the first communication node. The port number of the second DMRS is the port number of a downlink DMRS sent by the second communication node or the port number of an uplink DMRS received by the second communication node. The resource configuration type of the first DMRS is the resource configuration type used by the first communication node to send a downlink DMRS or the resource configuration type used by the first communication node to receive an uplink DMRS. The resource configuration type of the second DMRS is the resource configuration type used by the second communication node to send a downlink DMRS or the resource configuration type used by the second communication node to receive an uplink DMRS. The port number of the first PTRS is the port number of a downlink PTRS sent by the first communication node or the port number of an uplink PTRS received by the first communication node. The port number of the second PTRS is the port number of a downlink PTRS sent by the second communication node or the port number of an uplink PTRS received by the second communication node. The first transmission configuration indication is determined by the RRC signaling, the MAC-CE signaling or the DCI signaling. The second transmission configuration indication is determined by the RRC signaling, the MAC-CE signaling or the DCI signaling. The first transmission occasion index is the transmission occasion index of the first communication node sending the PDSCH or the transmission occasion index of the first communication node receiving the PUSCH. The second transmission occasion index is the transmission occasion index of the second communication node sending the PDSCH or the transmission occasion index of the second communication node receiving the PUSCH. The first spatial relationship information is determined by the RRC signaling, the MAC-CE signaling or the DCI signaling. The second spatial relationship information is determined by the RRC signaling, the MAC-CE signaling or the DCI signaling.

The frequency domain density of the first PTRS is the frequency domain density of a downlink PTRS sent by the first communication node or the frequency domain density of an uplink PTRS received by the first communication node. The frequency domain density of the second PTRS is the frequency domain density of a downlink PTRS sent by the second communication node or the frequency domain density of an uplink PTRS received by the second communication node. The first reference resource element is the reference resource element for the first communication node to send a downlink PTRS or the reference resource element for the first communication node to receive an uplink PTRS. The second reference resource element is the reference resource element for the second communication node to send a downlink PTRS or the reference resource element for the second communication node to receive an uplink PTRS. The first reference resource block is the reference resource block for the first communication node to send a downlink PTRS or the reference resource block for the first communication node to receive an uplink PTRS. The second reference resource block is the reference resource block for the second communication node to send a downlink PTRS or the reference resource block for the second communication node to receive an uplink PTRS. A first reference resource block offset is the reference resource block offset of the first communication node sending a downlink PTRS or the reference resource block offset of the first communication node receiving an uplink PTRS. A second reference resource block offset is the reference resource block offset of the second communication node sending a downlink PTRS or the reference resource block offset of the second communication node receiving an uplink PTRS.

It is to be noted that "first" and "second" in the present application may be used to distinguish whether the corresponding content is the content corresponding to the first communication node or the content corresponding to the second communication node. Exemplarily, the frequency domain density of the first PTRS is the PTRS frequency domain density corresponding to the first communication node. Moreover, the frequency domain density of the second PTRS is the PTRS frequency domain density corresponding to the second communication node. Other technical features are the same. Details are not described herein.

In addition, whether the technical features related to "first" and "second" in the present application correspond to uplink content or downlink content is determined according to whether it is currently for uplink transmission or downlink transmission.

Exemplarily, in the case where the PTRS frequency domain density is determined by the first transmission configuration indication and/or the second transmission configuration indication, each of the technical features described above corresponds to downlink content. The size of the first resource block is the size of a downlink scheduled resource block of the first communication node. The size of the second resource block is the size of a downlink scheduled resource block of the second communication node. The resource block index of the first PTRS is the resource block index of the first communication node sending a downlink PTRS. The resource block index of the second PTRS is the resource block index of the second communication node sending a downlink PTRS. The port number of the first DMRS is the port number of a downlink DMRS sent by the first communication node. The port number of the second DMRS is the port number of a downlink DMRS sent by the second communication node. The resource configuration type of the first DMRS is the resource configuration type used by the first communication node to send a downlink DMRS. The resource configuration type of the second DMRS is the resource configuration type used by the second communication node to send a downlink DMRS. The port number of the first PTRS is the port number of a downlink PTRS sent by the first communication node. The port number of the second PTRS is the port number of a downlink PTRS sent by the second communication node. The first transmission occasion index is the transmission occasion index of the first communication node sending the PDSCH. The second transmission occasion index is the transmission occasion index of the second communication node sending the PDSCH. The frequency domain density of the first PTRS is the frequency domain density of a downlink PTRS sent by the first communication node. The frequency domain density of the second PTRS is the frequency domain density of a downlink PTRS sent by the second communication node. The first reference resource element is the reference resource element for the first communication node to send a downlink PTRS. The second reference resource element is the reference resource element for the second communication node to send a downlink PTRS. The first reference resource block is the reference resource block for the first communication node to send a downlink PTRS. The second reference resource block is the reference resource block for the second communication node to send a downlink PTRS. The first reference resource block offset is the reference resource block offset of the first communication node sending a downlink PTRS. The second reference resource block offset is the reference resource block offset of the second communication node sending a downlink PTRS.

Exemplarily, in the case where the PTRS frequency domain density is determined by the first spatial relationship information and/or the second spatial relationship information, each of the technical features described above corresponds to uplink content. The size of the first resource block is the size of an uplink scheduled resource block of the first communication node. The size of the second resource block is the size of an uplink scheduled resource block of the second communication node. The resource block index of the first PTRS is the resource block index of the first communication node receiving an uplink PTRS. The resource block index of the second PTRS is the resource block index of the second communication node receiving an uplink PTRS. The port number of the first DMRS is the port number of an uplink DMRS received by the first communication node. The port number of the second DMRS is the port number of an uplink DMRS received by the second communication node. The resource configuration type of the first DMRS is the resource configuration type used by the first communication node to receive an uplink DMRS. The resource configuration type of the second DMRS is the resource configuration type used by the second communication node to receive an uplink DMRS. The port number of the first PTRS is the port number of an uplink PTRS received by the first communication node. The port number of the second PTRS is the port number of an uplink PTRS received by the second communication node. The first transmission occasion index is the transmission occasion index of the first communication node receiving the PUSCH. The second transmission occasion index is the transmission occasion index of the second communication node receiving the PUSCH. The frequency domain density of the first PTRS is the frequency domain density of an uplink PTRS received by the first communication node. The frequency domain density of the second PTRS is the frequency domain density of an uplink PTRS received by the second communication node. The first reference resource element is the reference resource element for the first communication node to receive an uplink PTRS. The second reference resource element is the reference resource element for the second communication node to receive an uplink PTRS. The first reference resource block is the reference resource block for the first communication node to receive an uplink PTRS. The second reference resource block is the reference resource block for the second communication node to receive an uplink PTRS. The first reference resource block offset is the reference resource block offset of the first communication node receiving an uplink PTRS. The second reference resource block offset is the reference resource block offset of the second communication node receiving an uplink PTRS.

It is to be noted that the port number of a DMRS may be considered as a port number for sending or receiving a DMRS. Moreover, the port numbers of a DMRS correspond to ports of the DMRS in a one-to-one manner and are the identifier of the ports of the DMRS, that is, the ID. The port number of a PTRS may be considered as a port number for sending or receiving a PTRS. Moreover, the port numbers of a PTRS correspond to ports of the PTRS in a one-to-one manner and are the identifier of the ports of the PTRS, that is, the ID.

In S120, the frequency domain position of the first PTRS and the frequency domain position of the second PTRS are determined according to the indication information and a predefined mapping relationship.

The predefined mapping relationship indicates a mapping relationship between the indication information and the frequency domain position of the first PTRS and a mapping relationship between the indication information and the frequency domain position of the second PTRS respectively. The frequency domain position of the first PTRS is a frequency domain position at which the first communication node sends a downlink PTRS or a frequency domain position at which the first communication node receives an uplink PTRS. The frequency domain position of the second PTRS is a frequency domain position at which the second communication node sends a downlink PTRS or a frequency domain position at which the second communication node receives an uplink PTRS.

In this step, the frequency domain position of the first PTRS and the frequency domain position of the second PTRS may be determined through searching the predefined mapping relationship according to the indication information.

The predefined mapping relationship is not limited herein as long as the relationship between the frequency domain position of the first PTRS and the indication information and the relationship between the second communication node and the indication information can be established.

In one example, the predefined mapping relationship includes one or more of the following: the mapping relationship between the PTRS frequency domain density and the size of a scheduled resource block; the mapping relationship between the port number of a DMRS, the resource configuration type of a DMRS and the reference resource element; the mapping relationship between the PTRS frequency domain density, the size of a scheduled resource block, the radio network temporary identifier and the reference resource block; the mapping relationship between the reference resource element, the reference resource block, the PTRS frequency domain density, the resource block index of a PTRS, the number of subcarriers in each resource block and the PTRS frequency domain position; the mapping relationship between the reference resource block offset, the reference resource element, the reference resource block, the PTRS frequency domain density, the resource block index of a PTRS, the number of subcarriers in each resource block and the PTRS frequency domain position; the mapping relationship between the transmission occasion index, the transmission configuration indication and the reference resource block offset; the mapping relationship between the transmission occasion index, the transmission configuration indication and the reference resource element offset; the mapping relationship between the reference resource element offset, the reference resource element, the reference resource block, the PTRS frequency domain density, the resource block index of a PTRS, the number of subcarriers in each resource block and the PTRS frequency domain position; the mapping relationship between the transmission occasion index, the transmission configuration indication, the reference resource block offset and the reference resource element offset; the mapping relationship between the reference resource element offset, the reference resource block offset, the reference resource element, the reference resource block, the PTRS frequency domain density, the resource block index of PTRS, the number of subcarriers in each resource block and the PTRS frequency domain position; the mapping relationship between the size of the precoding resource block group, the PTRS frequency domain density, the spatial relationship information and the reference resource block offset; the mapping relationship between the transmission occasion index, the spatial relationship information and the reference resource element offset; the mapping relationship between the transmission occasion index, the spatial relationship information, the reference resource block offset and the reference resource element offset; the mapping relationship between the transmission configuration indication, the PTRS frequency domain density, the size of the precoding resource block group and the reference resource block offset; the mapping relationship between the PTRS port, the PTRS frequency domain density, the size of a precoding resource block group and the reference resource block offset; the mapping relationship between the transmission occasion index, the PTRS port and the reference resource block offset; the mapping relationship between the transmission occasion index, the PTRS port and the reference resource element offset; the mapping relationship between the transmission occasion index, the PTRS port, the reference resource block offset and the reference resource element offset; the mapping relationship between the size of the precoding resource block group, the PTRS frequency domain density, the PTRS port and the reference resource block offset; the mapping relationship between the transmission occasion index, the PTRS port and the reference resource block offset; the mapping relationship between the transmission occasion index, the PTRS port and the reference resource element offset; and the mapping relationship between the transmission occasion index, the PTRS port, the reference resource block offset and the reference resource element offset; and the mapping relationship between the PTRS port and the beam-related information. The first PTRS port may have a mapping relationship with the first beam-related information. The second PTRS port may have a mapping relationship with the second beam-related information. The first beam-related information includes the first transmission configuration indication or the first spatial relationship information. The second beam-related information includes the second transmission configuration indication or the second spatial relationship information.

The position determination method for a reference signal provided by the present application includes acquiring the indication information; and according to the indication information and the predefined mapping relationship, determining the frequency domain position of the first PTRS and the frequency domain position of the second PTRS. The predefined mapping relationship indicates a mapping relationship between the indication information and the frequency domain position of the first PTRS and a mapping relationship between the indication information and the frequency domain position of the second PTRS respectively. With this method, the position of the PTRS resource can be effectively determined in the multi-TRP scenario, and communication efficiency can be improved.

On the basis of the preceding embodiments, variant embodiments of the preceding embodiment are proposed. It is to be noted here that for ease of description, only differences from the preceding embodiment are described in the variant embodiments.

In one embodiment, the indication information includes one or more of the following: the size of a first resource block, where the size of the first resource block is the size of a downlink scheduled resource block of the first communication node or the size of an uplink scheduled resource block of the first communication node; the size of a second resource block, where the size of the second resource block is the size of a downlink scheduled resource block of the second communication node or the size of an uplink scheduled resource block of the second communication node; the resource block index of a first PTRS, where the resource block index of the first PTRS is the resource block index of the first communication node sending a downlink PTRS or the resource block index of the first communication node receiving an uplink PTRS; the resource block index of a second PTRS, where the resource block index of the second PTRS is the resource block index of the second communication node sending a downlink PTRS or the resource block index of the second communication node receiving an uplink PTRS; the port number of a first DMRS, where the port number of the first DMRS is the port number of a downlink DMRS sent by the first communication node or the port number of an uplink DMRS received by the first communication node; the port number of a second DMRS, where the port number of the second DMRS is the port number of a downlink DMRS sent by the second communication node or the port number of an uplink DMRS received by the second communication node; the resource configuration type of the first DMRS, where the resource configuration type of the first DMRS is the resource configuration type used by the first communication node to send a downlink DMRS or the resource configuration type used by the first communication node to receive an uplink DMRS; the resource configuration type of the second DMRS, where the resource configuration type of the second DMRS is the resource configuration type used by the second communication node to send a downlink DMRS or the resource configuration type used by the second communication node to receive an uplink DMRS; the port number of a first PTRS, where the port number of the first PTRS is the port number of a downlink PTRS sent by the first communication node or the port number of an uplink PTRS received by the first communication node; the port number of a second PTRS, where the port number of the second PTRS is the port number of a downlink PTRS sent by the second communication node or the port number of an uplink PTRS received by the second communication node; a first transmission configuration indication, where the first transmission configuration indication is determined by an RRC signaling, a MAC-CE signaling or a DCI signaling; a second transmission configuration indication, where the second transmission configuration indication is determined by an RRC signaling, a MAC-CE signaling or a DCI signaling; first spatial relationship information, where the first spatial relationship information is determined by an RRC signaling, a MAC-CE signaling or a DCI signaling; second spatial relationship information, where the second spatial relationship information is determined by an RRC signaling, a MAC-CE signaling or a DCI signaling; a radio network temporary identifier; and the number of subcarriers in each resource block.

In one embodiment, the indication information includes the size of a precoding resource block group.

In one embodiment, the indication information includes one or more of the following: a first transmission occasion index and a second transmission occasion index. The first transmission occasion index is the transmission occasion index of the first communication node sending the PDSCH or the transmission occasion index of the first communication node receiving the PUSCH. The second transmission occasion index is the transmission occasion index of the second communication node sending the PDSCH or the transmission occasion index of the second communication node receiving the PUSCH.

In one embodiment, the predefined mapping relationship includes one or more of the following: the mapping relationship between the PTRS frequency domain density and the size of a scheduled resource block; the mapping relationship between the port number of a DMRS, the resource configuration type of a DMRS and the reference resource element; and the mapping relationship between the PTRS frequency domain density, the size of a scheduled resource block, a radio network temporary identifier and a reference resource block.

In one embodiment, the predefined mapping relationship includes the mapping relationship between the reference resource element, the reference resource block, the PTRS frequency domain density, the resource block index of a PTRS, the number of subcarriers in each resource block and the PTRS frequency domain position.

In one embodiment, the predefined mapping relationship includes one or more of the following: the mapping relationship between the transmission configuration indication, the PTRS frequency domain density, the size of a precoding resource block group and the reference resource block offset; and the mapping relationship between the PTRS port, the PTRS frequency domain density, the size of a precoding resource block group and the reference resource block offset. In one embodiment, the predefined mapping relationship includes the mapping relationship between the reference resource block offset, the reference resource element, the reference resource block, the PTRS frequency domain density, the resource block index of a PTRS, the number of subcarriers of in each resource block, and the PTRS frequency domain position.

In one embodiment, the predefined mapping relationship includes one or more of the following: the mapping relationship between the transmission occasion index, the transmission configuration indication and the reference resource block offset; and the mapping relationship between the transmission occasion index, the PTRS port and the reference resource block offset.

In one embodiment, the predefined mapping relationship includes one or more of the following: the mapping relationship between the transmission occasion index, the transmission configuration indication and the reference resource element offset; and the mapping relationship between the transmission occasion index, the PTRS port and the reference resource element offset.

In one embodiment, the predefined mapping relationship includes the mapping relationship between the reference resource element offset, the reference resource element, the reference resource block, the PTRS frequency domain density, the resource block index of a PTRS, the number of subcarriers in each resource block and the PTRS frequency domain position.

In one embodiment, the predefined mapping relationship includes one or more of the following: the mapping relationship between the transmission occasion index, the transmission configuration indication, the reference resource block offset and the reference resource element offset; the mapping relationship between the transmission occasion index, the PTRS port, the reference resource block offset and the reference resource element offset; and the mapping relationship between the reference resource element offset, the reference resource block offset, the reference resource element, the reference resource block, the PTRS frequency domain density, the resource block index of a PTRS, the number of subcarriers in each resource block and the PTRS frequency domain position.

In one embodiment, the method includes one or more of the following: the frequency domain density of the first PTRS is determined by the size of the first resource block, and the frequency domain density of the first PTRS is the frequency domain density of a downlink PTRS sent by the first communication node or the frequency domain density of an uplink PTRS received by the first communication node; the frequency domain density of the second PTRS is determined by the size of the second resource block, and the frequency domain density of the second PTRS is the frequency domain density of a downlink PTRS sent by the second communication node or the frequency domain density of an uplink PTRS received by the second communication node; the first reference resource element is determined by the port number of the first DMRS and the resource configuration type of the first DMRS, and the first reference resource element is the reference resource element for the first communication node to send a downlink PTRS or the reference resource element for the first communication node to receive an uplink PTRS; the second reference resource element is determined by the port number of the second DMRS and the resource configuration type of the second DMRS, and the second reference resource element is the reference resource element for the second communication node to send a downlink PTRS or the reference resource element for the second communication node to receive an uplink PTRS; the first reference resource block is determined by the frequency domain density of the first PTRS, the size of the first resource block and the radio network temporary identifier, and the first reference resource block is the reference resource block for the first communication node to send a downlink PTRS or the reference resource block for the first communication node to receive an uplink PTRS; and the second reference resource block is determined by the frequency domain density of the second PTRS, the size of the second resource block and the radio network temporary identifier, and the second reference resource block is the reference resource block for the second communication node to send a downlink PTRS or the reference resource block for the second communication node to receive an uplink PTRS.

In the present application, in the case of determining the frequency domain position of the first PTRS and the frequency domain position of the second PTRS, the frequency domain density of the first PTRS may be determined according to the size of the first resource block; the frequency domain density of the second PTRS may be determined according to the size of the second resource block; the first reference resource element may be determined according to the port number of the first DMRS and the resource configuration type of the first DMRS; the second reference resource element may be determined according to the port number of the second DMRS and the resource configuration type of the second DMRS; the first reference resource block may be determined according to the frequency domain density of the first PTRS, the size of the first resource block and the radio network temporary identifier; and the second reference resource block may be determined according to the frequency domain density of the second PTRS, the size of the second resource block and the radio network temporary identifier.

In one embodiment, the frequency domain position of the first PTRS is determined by the frequency domain density of the first PTRS, the first reference resource block, the first reference resource element, the resource block index of the first PTRS and the number of subcarriers in each resource block; and the frequency domain position of the second PTRS is determined by the frequency domain density of the second PTRS, the second reference resource block, the second reference resource element, the resource block index of the second PTRS and the number of subcarriers in each resource block.

In the present application, the frequency domain position of the first PTRS may be determined according to the frequency domain density of the first PTRS, the first reference resource block, the first reference resource element, the resource block index of the first PTRS and the number of subcarriers in each resource block; and the frequency domain position of the second PTRS may be determined according to the frequency domain density of the second PTRS, the second reference resource block, the second reference resource element, the resource block index of the second PTRS and the number of subcarriers in each resource block.

In one embodiment, the method includes one or more of the following: the first reference resource block offset is determined by the first transmission occasion index and a first transmission configuration indication, and the first reference resource block offset is the reference resource block offset of the first communication node sending a downlink PTRS or the reference resource block offset of the first communication node receiving an uplink PTRS; the second reference resource block offset is determined by the second transmission occasion index and the second transmission configuration indication, and the second reference resource block offset is the reference resource block offset of the second communication node sending a downlink PTRS or the reference resource block offset of the second communication node receiving an uplink PTRS; the first reference resource block offset is determined by the first transmission occasion index and the port number of the first PTRS; the second reference resource block offset is determined by the second transmission occasion index and the port number of the second PTRS; the frequency domain position of the first PTRS is determined by the frequency domain density of the first PTRS, the first reference resource block, the first reference resource block offset, the first reference resource element, the resource block index of the first PTRS and the number of subcarriers in each resource block; and the frequency domain position of the second PTRS is determined by the frequency domain density of the second PTRS, the second reference resource block, the second reference resource block offset, the second reference resource element, the resource block index of the second PTRS and the number of subcarriers in each resource block.

In the present application, the first reference resource block offset may be determined according to the first transmission occasion index and the first transmission configuration indication; the second reference resource block offset may be determined according to the second transmission occasion index and the second transmission configuration indication; the frequency domain position of the first PTRS may be determined according to the frequency domain density of the first PTRS, the first reference resource block, the first reference resource block offset, the first reference resource element, the resource block index of the first PTRS and the number of subcarriers in each resource block; and the frequency domain position of the second PTRS may be determined according to the frequency domain density of the second PTRS, the second reference resource block, the second reference resource block offset, the second reference resource element, the resource block index of the second PTRS and the number of subcarriers in each resource block.

In one embodiment, the method includes one or more of the following: the first reference resource element offset is determined by the first transmission occasion index and the first transmission configuration indication; the second reference resource element offset is determined by the second transmission occasion index and the second transmission configuration indication; the frequency domain position of the first PTRS is determined by the frequency domain density of the first PTRS, the first reference resource element offset, the first reference resource element, the size of the first resource block, the resource block index of the first PTRS and the number of subcarriers in each resource block; and the frequency domain position of the second PTRS is determined by the frequency domain density of the second PTRS, the second reference resource element offset, the second reference resource element, the size of the second resource block, the resource block index of the second PTRS and the number of subcarriers in each resource block. The first reference resource element offset is determined by the first transmission occasion index and the port number of the first PTRS. The second reference resource element offset is determined by the second transmission occasion index and the port number of the second PTRS.

In the present application, the first reference resource element offset may be determined according to the first transmission occasion index and the first transmission configuration indication; the second reference resource element may be determined according to the second transmission occasion index and the second transmission configuration indication; the frequency domain position of the first PTRS may be determined according to the frequency domain density of the first PTRS, the first reference resource block, the first reference resource element offset, the first reference resource element, the resource block index of the first PTRS and the number of subcarriers in each resource block; and the frequency domain position of the second PTRS may be determined according to the frequency domain density of the second PTRS, the second reference resource block, the second reference resource element offset, the second reference resource element, the resource block index of the second PTRS and the number of subcarriers in each resource block.

In one embodiment, the method includes one or more of the following: the first reference resource block offset and the first reference resource element offset are determined by the first transmission occasion index and the first transmission configuration indication; the second reference resource block offset and the second reference resource element offset are determined by the second transmission occasion index and the second transmission configuration indication; the frequency domain position of the first PTRS is determined by the frequency domain density of the first PTRS, the first reference resource block, the first reference resource block offset, the first reference resource element offset, the first reference resource element, the resource block index of the first PTRS and the number of subcarriers in each resource block; and the frequency domain position of the second PTRS is determined by the frequency domain density of the second PTRS, the second reference resource block, the second reference resource block offset, the second reference resource element offset, the second reference resource element, the resource block index of the second PTRS and the number of subcarriers in each resource block. The first reference resource block offset and the first reference resource element offset are determined by the first transmission occasion index and the port number of the first PTRS. The second reference resource block offset and the second reference resource element offset are determined by the second transmission occasion index and the port number of the second PTRS.

In the present application, the first reference resource block offset and the first reference resource element offset may be determined according to the first transmission occasion index and the first transmission configuration indication; the second reference resource block offset and the second reference resource element offset may be determined according to the second transmission occasion index and the second transmission configuration indication; the frequency domain position of the first PTRS may be determined according to the frequency domain density of the first PTRS, the first reference resource block, the first reference resource block offset, the first reference resource element offset, the first reference resource element, the resource block index of the first PTRS and the number of subcarriers in each resource block; and the frequency domain position of the second PTRS may be determined according to the frequency domain density of the second PTRS, the second reference resource block, the second reference resource block offset, the second reference resource element offset, the second reference resource element, the resource block index of the second PTRS and the number of subcarriers in each resource block.

In one embodiment, the method includes one or more of the following: the frequency domain density of the first PTRS and the frequency domain density of the second PTRS are determined by the sum of the size of the first resource block and the size of the second resource block; the first reference resource element and the second reference resource element are determined by the port number of the first DMRS and the resource configuration type of the first DMRS; the first reference resource element and the second reference resource element are determined by the port number of the second DMRS and the resource configuration type of the second DMRS; the first reference resource element and the second reference resource element are determined by the port number and the resource configuration type of the DMRS of a communication node whose scheduled resource block is smaller among the first communication node and the second communication node; the first reference resource element and the second reference resource element are determined by the port number and the resource configuration type of the DMRS of a communication node whose scheduled resource block is larger among the first communication node and the second communication node; the first reference resource block and the second reference resource block are determined by the frequency domain density of the first PTRS, the size of the first resource block and the radio network temporary identifier; the first reference resource block and the second reference resource block are determined by the frequency domain density of the first PTRS, the size of the second resource block and the radio network temporary identifier; the first reference resource block and the second reference resource block are determined by the frequency domain density of the first PTRS, the size of a resource block whose scheduled resource block is larger in the first communication node and the second communication node and the radio network temporary identifier; the first reference resource block and the second reference resource block are determined by the frequency domain density of the first PTRS, the size of a resource block whose scheduled resource block is smaller among the first communication node and the second communication node and the radio network temporary identifier; the first reference resource block offset is determined by the size of a precoding resource block group, the frequency domain density of the first PTRS and the first transmission configuration indication; the second reference resource block offset is determined by the size of a precoding resource block group, the frequency domain density of the second PTRS and the second transmission configuration indication; the frequency domain position of the first PTRS is determined by the frequency domain density of the first PTRS, the first reference resource block, the first reference resource block offset, the first reference resource element, the resource block index of the first PTRS and the number of subcarriers in each resource block; the frequency domain position of the second PTRS is determined by the frequency domain density of the second PTRS, the second reference resource block, the second reference resource block offset, the second reference resource element, the resource block index of the second PTRS and the number of subcarriers in each resource block; the first reference resource block offset is determined by the size of a precoding resource block group, the frequency domain density of the first PTRS and the port number of the first PTRS; and the second reference resource block offset is determined by the size of a precoding resource block group, the frequency domain density of the second PTRS, and the port number of the second PTRS.

In the present application, the frequency domain density of the first PTRS and the frequency domain density of the second PTRS may be determined according to the sum of the size of the first resource block and the size of the second resource block; the first reference resource element and the second reference resource element may be determined according to the port number of the first DMRS and the resource configuration type of the first DMRS; the first reference resource element and the second reference resource element may be determined according to the port number of the second DMRS and the resource configuration type of the second DMRS; the first reference resource element and the second reference resource element may be determined according to the port number and the resource configuration type of the DMRS of a communication node whose scheduled resource block is smaller among the first communication node and the second communication node; the first reference resource element and the second reference resource element may be determined according to the port number and the resource configuration type of the DMRS of a communication node whose scheduled resource block is larger among the first communication node and the second communication node; the first reference resource block and the second reference resource block may be determined according to the frequency domain density of the first PTRS, the size of the first resource block and the radio network temporary identifier; the first reference resource block and the second reference resource block may be determined according to the frequency domain density of the first PTRS, the size of the second resource block and the radio network temporary identifier; the first reference resource block and the second reference resource block may be determined according to the frequency domain density of the first PTRS, the size of a resource block whose scheduled resource block is larger in the first communication node and the second communication node and the radio network temporary identifier; the first reference resource block and the second reference resource block may be determined according to the frequency domain density of the first PTRS, the size of a resource block whose scheduled resource block is smaller in the first communication node and the second communication node and the radio network temporary identifier; the first reference resource block offset may be determined according to the size of a precoding resource block group, the frequency domain density of the first PTRS and the first transmission configuration indication; the second reference resource block offset may be determined according to the size of a precoding resource block group, the frequency domain density of the second PTRS and the second transmission configuration indication; the frequency domain position of the first PTRS may be determined according to the frequency domain density of the first PTRS, the first reference resource block, the first reference resource block offset, the first reference resource element, the resource block index of the first PTRS and the number of subcarriers in each resource block; and the frequency domain position of the second PTRS may be determined according to the frequency domain density of the second PTRS, the second reference resource block, the second reference resource block offset, the second reference resource element, the resource block index of the second PTRS and the number of subcarriers in each resource block.

In one embodiment, the predefined mapping relationship includes one or more of the following: the mapping relationship between the size of a precoding resource block group, the PTRS frequency domain density, the spatial relationship information and the reference resource block offset; and the mapping relationship between the size of a precoding resource block group, the PTRS frequency domain density, the PTRS port and the reference resource block offset.

In one embodiment, the predefined mapping relationship includes one or more of the following: the mapping relationship between the transmission occasion index, the spatial relationship information and the reference resource block offset; and the mapping relationship between the transmission occasion index, the PTRS port and the reference resource block offset.

In one embodiment, the predefined mapping relationship includes one or more of the following: the mapping relationship between the transmission occasion index, the spatial relationship information and the reference resource element offset; and the mapping relationship between the transmission occasion index, the PTRS port and the reference resource element offset.

In one embodiment, the predefined mapping relationship includes one or more of the following: the mapping relationship between the transmission occasion index, the spatial relationship information, the reference resource block offset and the reference resource element offset; and the mapping relationship between the transmission occasion index, the PTRS port, the reference resource block offset and the reference resource element offset.

In one embodiment, the method includes one or more of the following: the first reference resource block offset is determined by the size of a precoding resource block group, the PTRS frequency domain density and the first spatial relationship information; and the second reference resource block offset is determined by the size of a precoding resource block group, the PTRS frequency domain density and the second spatial relationship information.

In the present application, the first reference resource block offset may be determined according to the size of a precoding resource block group, the PTRS frequency domain density and the first spatial relationship information; and the second reference resource block offset may be determined according to the size of a precoding resource block group, the PTRS frequency domain density and the second spatial relationship information.

In one embodiment, the method includes one or more of the following: the first reference resource block offset is determined by the first transmission occasion index and the first spatial relationship information; and the second reference resource block offset is determined by the second transmission occasion index and the second spatial relationship information.

In the present application, the first reference resource block offset may be determined according to the first transmission occasion index and the first spatial relationship information; and the second reference resource block offset may be determined according to the second transmission occasion index and the second spatial relationship information.

In one embodiment, the method includes one or more of the following: the first reference resource element offset is determined by the first transmission occasion index and the first spatial relationship information; and the second reference resource element offset is determined by the second transmission occasion index and the second spatial relationship information.

In the present application, the first reference resource element offset may be determined according to the first transmission occasion index and the first spatial relationship information; and the second reference resource element offset may be determined according to the second transmission occasion index and the second spatial relationship information.

In one embodiment, the method includes one or more of the following: the first reference resource block offset and the first reference resource element offset are determined by the first transmission occasion index and the first spatial relationship information; and the second reference resource block offset and the second reference resource element offset are determined by the second transmission occasion index and the second spatial relationship information.

In the present application, the first reference resource block offset and the first reference resource element offset may be determined according to the first transmission occasion index and the first spatial relationship information; and the second reference resource block offset and the second reference resource element offset may be determined according to the second transmission occasion index and the second spatial relationship information.

In one embodiment, the first reference resource block offset is associated with the first spatial relationship information, and the second reference resource block offset is associated with the second spatial relationship information.

In the present application, the first reference resource block offset may be determined according to the first spatial relationship information; and the second reference resource block offset may be determined according to the second spatial relationship information.

In one embodiment, the first reference resource block offset is associated with the first transmission configuration indication, and the second reference resource block offset is associated with the second transmission configuration indication.

In the present application, the first reference resource block offset may be determined according to the first transmission configuration indication; and the second reference resource block offset may be determined according to the second transmission configuration indication.

The first reference resource block offset is associated with the first PTRS port, and the second reference resource block offset is associated with the second PTRS port.

In one embodiment, in the case of configuring two PTRS ports, the first reference resource block offset is associated with a first DMRS port, and the second reference resource block offset is associated with a second DMRS port.

"First" and "Second" can be used to distinguish DMRS.

The following is an exemplary description of the present application. In the present application, when PTRS frequency domain positions of two TRPs are determined, each TRP performs corresponding calculation according to the TCI indicated by a TCI code point. Moreover, when PTRS frequency domain positions of two TRPs are determined, the two TRPs need to be configured with corresponding RB offsets and indicated by the TCI in a TCI code point. When PTRS time domain positions of two TRPs are determined, the two TRPs need to be configured with corresponding symbol offsets, and each TRP performs corresponding calculation according to the TCI indicated by a TCI code point.

Example 1

A position determination method for a reference signal resource includes determining the frequency domain position of a first PTRS and the frequency domain position of a second PTRS according to indication information and a predefined mapping relationship.

The indication information includes the size of the first resource block, the size of the second resource block, the resource block index of the first PTRS, the resource block index of the second PTRS, the port number of the first DMRS, the port number of the second DMRS, the resource configuration type of the first DMRS, the resource configuration type of the second DMRS, the first transmission configuration indication, the second transmission configuration indication, the radio network temporary identifier and the number of subcarriers in each resource block.

The predefined mapping relationship includes the mapping relationship between the PTRS frequency domain density and scheduled bandwidth (that is, the size of the scheduled resource block), the mapping relationship between the port number of the demodulation reference signal, the resource configuration type of the demodulation reference signal and the reference resource element, the mapping relationship between the PTRS frequency domain density, the size of the scheduled resource block, the radio network temporary identifier and the reference resource block and the mapping relationship between the reference resource element, the reference resource block, the PTRS frequency domain density, the size of the scheduled resource block, the resource block index of a PTRS, the number of subcarriers in each resource block and the PTRS frequency domain position.

The frequency domain density of the first PTRS is determined by the size of the first resource block. The frequency domain density of the second PTRS is determined by the size of the second resource block. The first reference resource element is determined by the port number of the first DMRS, the resource configuration type of the first DMRS and the like. The second reference resource element is determined by the port number of the second DMRS, the resource configuration type of the second DMRS and the like. The first reference resource block is determined by the frequency domain density of the first PTRS, the size of the first resource block, the radio network temporary identifier and the like. The second reference resource block is determined by the frequency domain density of the second PTRS, the size of the second resource block, the radio network temporary identifier and the like. The frequency domain position of the first PTRS is determined by the frequency domain density of the first PTRS, the first reference resource block, the first reference resource element, the resource block index of the first PTRS, the number of subcarriers in each resource block and the like. The frequency domain position of the second PTRS is determined by the frequency domain density of the second PTRS, the second reference resource block, the second reference resource element, the resource block index of the second PTRS, the number of subcarriers in each resource block and the like.

In the case where the first communication node configures two PTRS ports, the first PTRS port and the second PTRS port are associated with the first transmission configuration indication and the second transmission configuration indication respectively. Alternatively, the first PTRS port and the second PTRS port are associated with the first spatial relationship information and the second spatial relationship information respectively.

In one embodiment, the frequency domain position of the first PTRS and the frequency domain position of the second PTRS may be calculated according to the following formula:
k=Ref_RE+i*K_PTRS+Ref_RB*N_SC.

k denotes the PTRS frequency domain position. Ref_RE denotes the reference resource element. K_PTRS denotes the PTRS frequency domain density. Ref_RB denotes the reference resource block. i denotes the directory index (that is, the resource block index of a PTRS) of an actually scheduled PTRS in the frequency domain. N_SC denotes the number of subcarriers in each resource block.

Figure 1A:
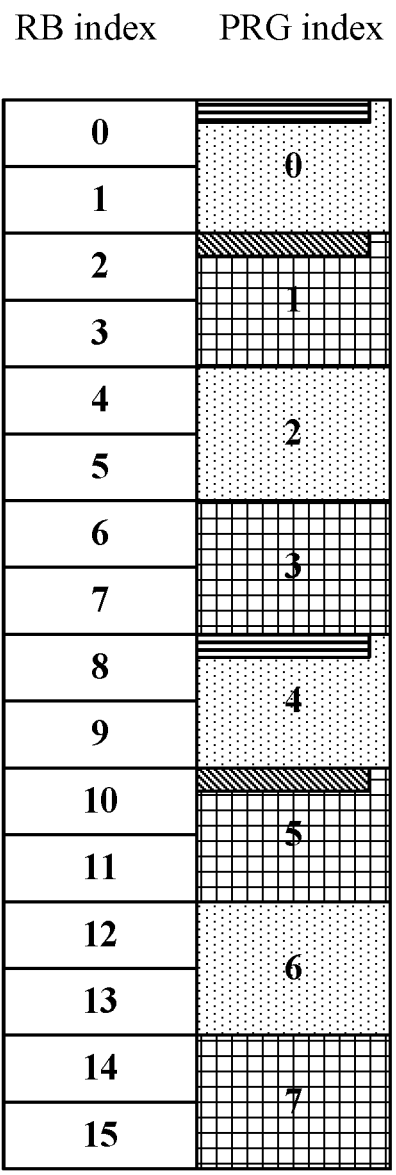
FIG. 1A is a diagram of resource block indexes.
Figure 1A:
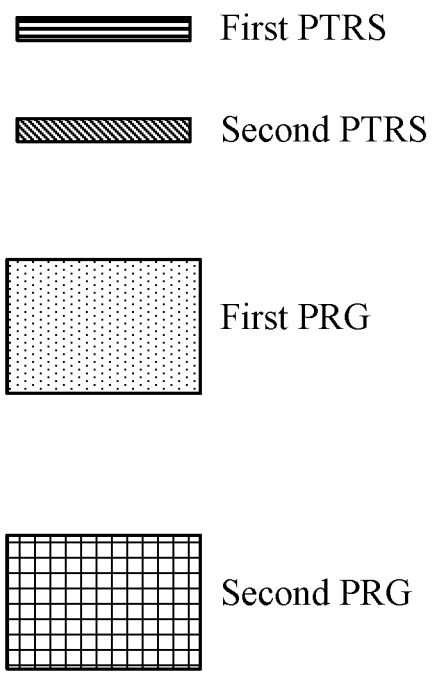

In one example, FIG. 1A is a diagram of resource block indexes. As shown in FIG. 1A, resource block indexes of the first PTRSs and resource block indexes of the second PTRSs are indexed according to RBs in first PRGs and RBs in second PRGs respectively. In the case where PRG_size=2 and K_PTRS=4, RBs corresponding to even-indexed PRGs, that is, RBs corresponding to first PRGs are allocated to the first communication node, and RB s corresponding to odd-indexed PRGs, that is, RBs corresponding to second PRGs are allocated to the second communication node. In the case where each of two communication nodes schedules eight RBs, the resource block indexes of the first PTRSs are 0, 1, 4, 5, 8, 9, 12 and 13, and the resource block indexes of the second PTRSs are 2, 3, 6, 7, 10, 11, 14 and 15. The resource block indexes of the first PTRSs are 0 and 8. The resource block indexes of the second PTRS are 2 and 10.

Example 2

A position determination method for a reference signal resource includes that a first communication node determines the frequency domain position of a first PTRS and the frequency domain position of a second PTRS according to indication information and a predefined mapping relationship.

The indication information includes the size of the first resource block, the size of the second resource block, the resource block index of the first PTRS, the resource block index of the second PTRS, the port number of the first DMRS, the port number of the second DMRS, the resource configuration type of the first DMRS, the resource configuration type of the second DMRS, the first transmission configuration indication, the second transmission configuration indication, the radio network temporary identifier, the number of subcarriers in each resource block and the size of a precoding resource block group.

The predefined mapping relationship includes the mapping relationship between the PTRS frequency domain density and the scheduled bandwidth; the mapping relationship between the port number of the demodulation reference signal, the resource configuration type of the demodulation reference signal and the reference resource element; the mapping relationship between the PTRS frequency domain density, the size of the scheduled resource block, the radio network temporary identifier and the reference resource block; the mapping relationship between the size of a precoding resource block group, the PTRS frequency domain density, the transmission configuration indication and the reference resource block offset; the mapping relationship between the PTRS port, the PTRS frequency domain density, the size of a precoding resource block group and the reference resource block offset; and the mapping relationship between the reference resource block offset, the reference resource element, the reference resource block, the PTRS frequency domain density, the size of the scheduled resource block, the resource block index of a PTRS, the number of subcarriers in each resource block and the PTRS frequency domain position.

In the present application, it is to be noted that the PTRS port and the DMRS port may be identified by the corresponding PTRS port number and the DMRS port number. In a mapping relationship, the PTRS port and the DMRS port may be understood as the PTRS port number and the DMRS port number.

The frequency domain density of the first PTRS and the frequency domain density of the second PTRS are determined by the sum of the size of the first resource block and the size of the second resource block.

The first reference resource element and the second reference resource element are determined by the port number of the first DMRS, the resource configuration type of the first DMRS and the like. Alternatively, the first reference resource element and the second reference resource element are determined by the port number of the second DMRS, the resource configuration type of the second DMRS and the like. Alternatively, the first reference resource element and the second reference resource element are determined by the DMRS port number of a communication node having a smaller scheduled resource block of two communication nodes, the DMRS resource configuration type of the communication node having a smaller scheduled resource block and the like. Alternatively, the first reference resource element and the second reference resource element are determined by the DMRS port number of a communication node having a larger scheduled resource block of two communication nodes, the DMRS resource configuration type of the communication node having a larger scheduled resource block and the like.

The first reference resource block and the second reference resource block are determined by the frequency domain density of the first PTRS, the size of the first resource block, the radio network temporary identifier and the like. Alternatively, the first reference resource block and the second reference resource block are determined by the frequency domain density of the first PTRS, the size of the second resource block, the radio network temporary identifier and the like. Alternatively, the first reference resource block and the second reference resource block are determined by the frequency domain density of the first PTRS, the size of a resource block having a larger scheduled resource block in two communication nodes, the radio network temporary identifier and the like. Alternatively, the first reference resource block and the second reference resource block are determined by the frequency domain density of the first PTRS, the size of a resource block having a smaller scheduled resource block in two communication nodes, the radio network temporary identifier and the like.

The first reference resource block offset is determined by the size of a precoding resource block group, the frequency domain density of the first PTRS, the first transmission configuration indication and the like. Alternatively, the first reference resource block offset is determined by the port number of the first PTRS, the frequency domain density of the first PTRS, the size of a precoding resource block group and the like.

The second reference resource block offset is determined by the size of a precoding resource block group, the frequency domain density of the second PTRS, the second transmission configuration indication and the like. Alternatively, the second reference resource block offset is determined by the port number of the second PTRS, the frequency domain density of the second PTRS, the size of a precoding resource block group and the like.

The first transmission indication and the second transmission indication may be determined by the RRC signaling, the MAC-CE signaling or the DCI signaling.

The frequency domain position of the first PTRS is determined by the frequency domain density of the first PTRS, the first reference resource block, the first reference resource block offset, the first reference resource element, the resource block index of the first PTRS, the number of subcarriers in each resource block and the like.

The frequency domain position of the second PTRS is determined by the frequency domain density of the second PTRS, the second reference resource block, the second reference resource block offset, the second reference resource element, the resource block index of the second PTRS, the number of subcarriers in each resource block and the like.

In one embodiment, the first reference resource block offset and the second reference resource block offset are configured according to at least one of the following manners: in the case where K_PTRS=4 and PRG_size=2, Ref_RB_offset1=0 and Ref_RB_offset2=2; in the case where K_PTRS=4 and PRG_size=2, Ref_RB_offset1=2 and Ref_RB_offset2=0; in the case where K_PTRS=4 and PRG_size=2, Ref_RB_offset1=0 and Ref_RB_offset2=1; in the case where K_PTRS=4 and PRG_size=2, Ref_RB_offset1=1 and Ref_RB_offset2=0; in the case where K_PTRS=4 and PRG_size=4, Ref_RB_offset1=0 and Ref_RB_offset2=0; in the case where K_PTRS=2 and PRG_size=2, Ref_RB_offset1=0 and Ref_RB_offset2=0; in the case where K_PTRS=2 and PRG_size=4, Ref_RB_offset1=0 and Ref_RB_offset2=0; in the case where K_PTRS=4 and PRG_size is wideband, Ref_RB_offset1=0 and Ref_RB_offset2=0; or in the case where K_PTRS=2 and PRG_size is wideband, Ref_RB_offset1=0 and Ref_RB_offset2=0.

K_PTRS denotes the frequency domain density of the first PTRS and the frequency domain density of the second PTRS. PRG_size denotes the size of a precoding resource block group. Ref_RB_offset1 denotes the first reference resource block offset. Ref_RB_offset2 denotes the second reference resource block offset.

In one embodiment, the first reference resource block offset and the second reference resource block offset are associated with the first transmission indication and the second transmission indication respectively. The TCI state value of the first transmission indication is 1, representing the first communication node. The TCI state value of the second transmission indication is 2, representing the second communication node. Table 1-1 is a mapping table of the reference resource block offset provided by this example.

TABLE 1-1

Mapping table of the reference resource block offset

| TCI State | PRG_size | K_PTRS | Ref_RB_offset |
|---|---|---|---|
| 1 | 2 | 2 | 0 |
| 2 | 2 | 2 | 0 |
| 1 | 2 | 4 | 0 |
| 2 | 2 | 4 | 2 |
| 1 | 2 | 4 | 2 |
| 2 | 2 | 4 | 0 |
| 2 | 2 | 4 | 1 |
| 1 | 2 | 4 | 1 |
| 1 | 4 | 2 | 0 |
| 2 | 4 | 2 | 0 |
| 1 | 4 | 4 | 0 |
| 2 | 4 | 4 | 0 |
| 1 | Wideband | 2 | 0 |
| 2 | Wideband | 2 | 0 |
| 1 | Wideband | 4 | 0 |
| 2 | Wideband | 4 | 0 |
| 1 | 2 | 2 | 0 |
| 2 | 2 | 2 | 0 |

Table 1-1 shows the manner of determining the reference resource block offset. The reference resource block offset can be determined according to TCI state, PRG_size and K_PTRS. TCI state may be the transmission configuration indication.

In the case where two PTRS ports are supported, the first PTRS port is associated with the first transmission configuration indication, and the second PTRS port is associated with the second transmission configuration indication.

In one embodiment, in the case where two PTRS ports are supported, the first reference resource block offset and the second reference resource block offset may be associated with the PTRS port 0 and the PTRS port 1 respectively. Table 1-2 is another mapping table of the reference resource block offset provided by this example.

The PTRS port 0 and the PTRS port 1 may correspond to the first PTRS port and the second PTRS port. The corresponding relationship is not limited here.

TABLE 1-2

Mapping table of the reference resource block offset

| PTRS Port | PRG_size | K_PTRS | Ref_RB_offset |
|---|---|---|---|
| 0 | 2 | 2 | 0 |
| 1 | 2 | 2 | 0 |
| 0 | 2 | 4 | 0 |
| 1 | 2 | 4 | 2 |
| 0 | 2 | 4 | 2 |
| 1 | 2 | 4 | 0 |
| 1 | 2 | 4 | 1 |
| 0 | 2 | 4 | 1 |
| 0 | 4 | 2 | 0 |
| 1 | 4 | 2 | 0 |

TABLE 1-2-continued

Mapping table of the reference resource block offset

| PTRS Port | PRG_size | K_PTRS | Ref_RB_offset |
|---|---|---|---|
| 1 | 4 | 4 | 0 |
| 0 | 4 | 4 | 0 |
| 0 | Wideband | 2 | 0 |
| 1 | Wideband | 2 | 0 |
| 0 | Wideband | 4 | 0 |
| 1 | Wideband | 4 | 0 |
| 0 | 2 | 2 | 0 |
| 1 | 2 | 2 | 0 |

Table 1-2 shows the manner of determining the reference resource block offset. In the case where the reference resource block offset is associated with the PTRS port, the reference resource block offset can be determined according to the PTRS port, PRG_size and K_PTRS.

In one embodiment, the frequency domain position of the first PTRS and the frequency domain position of the second PTRS may be calculated according to the following formula:

$$k = \text{Ref\_RE} + (i * \text{K\_PTRS} + \text{Ref\_RB} + \text{Ref\_RB\_offset}) * \text{N\_SC; or}$$

$$k = \begin{cases} \text{Ref\_RE} + (i * \text{K\_PTRS} + \text{Ref\_RB\_offset}) * \text{N\_SC, if } A \\ \text{Ref\_RE} + (i * \text{K\_PTRS} + \text{Ref\_RB}) * \text{N\_SC, if } B \end{cases}$$

A may denote PGR_size=2 and K_PTRS=4. B may denote PGR_size=2 and K_PTRS=2, PGR_size=4 and K_PTRS=2, PRG_size being wideband and K_PTRS=2 or PRG_size being wideband and K_PTRS=4.

k denotes the PTRS frequency domain position. Ref_RE denotes the reference resource element. K_PTRS denotes the PTRS frequency domain density. Ref_RB denotes the reference resource block. i denotes the directory index of an actually scheduled PTRS in the frequency domain. N_SC denotes the number of subcarriers in each resource block. Ref_RB_offset denotes the reference resource block offset. Ref_RB_offset may be acquired according to the preceding configuration method.

Figure 1B:
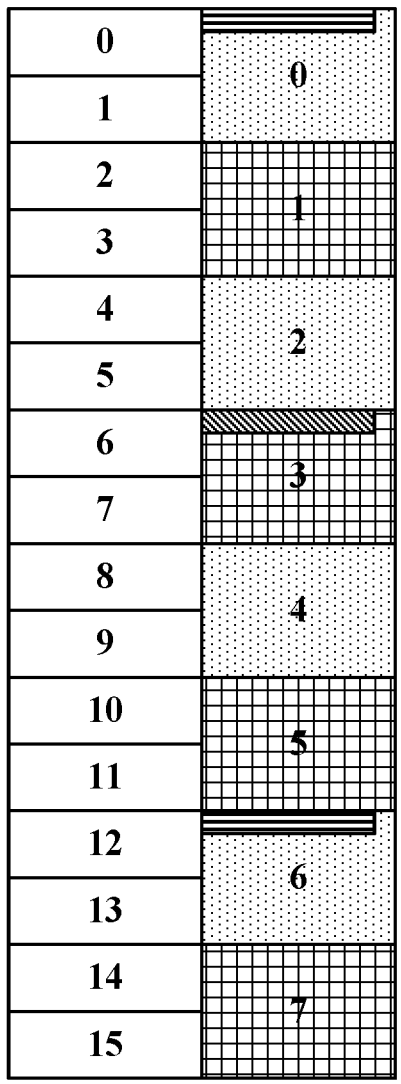
FIG. 1B is another diagram of resource block indexes according to the example.

FIG. 1B is another diagram of resource block indexes according to the example. FIG. 1B shows resource block indexes of the first PTRS and the resource block index of the second PTRS. Without distinguishing TRP first, the resource block offset scheduled by two communication nodes are determined according to corresponding mapping relationship, and finally the respective resource block indexes of PTRSs are determined. In the case where PRG_size=2 and K_PTRS=4, RBs corresponding to even-indexed PRGs, that is, RBs corresponding to first PRGs are allocated to the first communication node, and RB s corresponding to odd-indexed PRGs, that is RBs corresponding to second PRGs are allocated to the second communication node. In the case where each of two communication nodes schedules eight RBs, the resource block indexes of the first PTRS are 0, 1, 4, 5, 8, 9, 12 and 13, and the resource block indexes of the second PTRS are 2, 3, 6, 7, 10, 11, 14 and 15. The resource block indexes of the first PTRS are 0 and 12. The resource block index of the second PTRS is 6.

Example 3

A position determination method for a reference signal resource includes that a first communication node determines the frequency domain position of a first PTRS and the frequency domain position of a second PTRS according to indication information and a predefined mapping relationship.

The indication information includes the size of the first resource block, the size of the second resource block, the resource block index of the first PTRS, the resource block index of the second PTRS, the port number of the first DMRS, the port number of the second DMRS, the resource configuration type of the first DMRS, the resource configuration type of the second DMRS, the first transmission configuration indication, the second transmission configuration indication, the radio network temporary identifier, the number of subcarriers in each resource block, the size of a precoding resource block group, the first transmission occasion index and the second transmission occasion index.

The predefined mapping relationship includes the mapping relationship between the PTRS frequency domain density and the scheduled bandwidth; the mapping relationship between the port number of the demodulation reference signal, the resource configuration type of the demodulation reference signal and the reference resource element; the mapping relationship between the PTRS frequency domain density, the size of the scheduled resource block, the radio network temporary identifier and the reference resource block; the mapping relationship between the transmission occasion index, the transmission configuration indication and the reference resource block offset; the mapping relationship between the transmission occasion index, the PTRS port and the reference resource block offset; and the mapping relationship between the reference resource block offset, the reference resource element, the reference resource block, the PTRS frequency domain density, the size of the scheduled resource block, the resource block index of a PTRS, the number of subcarriers in each resource block and the PTRS frequency domain position.

The frequency domain density of the first PTRS is determined by the size of the first resource block. The frequency domain density of the second PTRS is determined by the size of the second resource block.

The first reference resource element is determined by the port number of the first DMRS, the resource configuration type of the first DMRS and the like. The second reference resource element is determined by the port number of the second DMRS, the resource configuration type of the second DMRS and the like.

The first reference resource block is determined by the frequency domain density of the first PTRS, the size of the first resource block, the radio network temporary identifier and the like. The second reference resource block is determined by the frequency domain density of the second PTRS, the size of the second resource block, the radio network temporary identifier and the like.

The first reference resource block offset is determined by the first transmission occasion index, the first transmission configuration indication and the like. Alternatively, the first reference resource block offset is determined by the first transmission occasion index, the port number of the first PTRS and the like. The second reference resource block offset is determined by the second transmission occasion index, the second transmission configuration indication and the like. Alternatively, the second reference resource block offset is determined by the first transmission occasion index, the port number of the second PTRS and the like.

The frequency domain position of the first PTRS is determined by the frequency domain density of the first PTRS, the first reference resource block, the first reference resource block offset, the first reference resource element, the resource block index of the first PTRS, the number of subcarriers in each resource block and the like. The frequency domain position of the second PTRS is determined by the frequency domain density of the second PTRS, the second reference resource block, the second reference resource block offset, the second reference resource element, the resource block index of the second PTRS, the number of subcarriers in each resource block and the like.

The first transmission indication and the second transmission indication may be determined by the RRC signaling, the MAC-CE signaling or the DCI signaling.

In one embodiment, the first reference resource block offset and the second reference resource block offset are configured in at least one of the following manners: the transmission occasion index is 1, and Ref_RB_offset=0; the transmission occasion index is 2, and Ref_RB_offset=1; the transmission occasion index is 3, and Ref_RB_offset=2; and the transmission occasion index is 4, and Ref_RB_offset=3; or the transmission occasion index is 1, and Ref_RB_offset=0; the transmission occasion index is 2, and Ref_RB_offset=1; the transmission occasion index is 3, and Ref_RB_offset=2; the transmission occasion index is 4, and Ref_RB_offset=3; the transmission occasion index is 5, and Ref_RB_offset=4; the transmission occasion index is 6, and Ref_RB_offset=5; the transmission occasion index is 7, and Ref_RB_offset=6; and the transmission occasion index is 8, and Ref_RB_offset=7.

When the transmission occasion index is an odd number, Ref_RB_offset denotes the first reference resource block offset; and when the transmission occasion index is an even number, Ref_RB_offset denotes the second reference resource block offset. Alternatively, when the transmission occasion index is an odd number, Ref_RB_offset denotes the second reference resource block offset; and when the transmission occasion index is an even number, Ref_RB_offset denotes the first reference resource block offset. Alternatively, for the first half of the transmission occasion index, Ref_RB_offset denotes the first reference resource block offset; and for the second half of the transmission occasion index, Ref_RB_offset denotes the second reference resource block offset. Alternatively, for the first half of the transmission occasion index, Ref_RB_offset denotes the second reference resource block offset; and for the second half of the transmission occasion index, Ref_RB_offset denotes the first reference resource block offset.

In one embodiment, the first reference resource block offset and the second reference resource block offset are associated with the first transmission indication and the second transmission indication respectively. The TCI state value of the first transmission indication is 1, representing the first communication node. The TCI state value of the second transmission indication is 2, representing the second communication node. Table 2-1 is another mapping table of the reference resource block offset provided by this example. Table 2-2 is another mapping table of the reference resource block offset provided by this example. Table 2-3 is another mapping table of the reference resource block offset provided by this example. Table 2-4 is another mapping table of the reference resource block offset provided by this example. Table 2-5 is another mapping table of the reference resource block offset provided by this example. Table 2-6 is another mapping table of the reference resource block offset provided by this example. Table 2-7 is another mapping table of the reference resource block offset provided by this example. Table 2-8 is another mapping table of the reference resource block offset provided by this example. Tables 2-1, 2-2, 2-3 and 2-4 show the mapping relationship between the reference resource block offset, the transmission occasion index and the TCI state. Tables 2-5, 2-6, 2-7 and 2-8 show the mapping relationship between the reference resource block offset, the transmission occasion index and the PTRS port.

TABLE 2-1

Mapping table of the reference resource block offset

| TCI State | Transmission occasion Index | Ref_RB_offset |
|---|---|---|
| 1 | 1 | 0 |
| 1 | 2 | 1 |
| 2 | 3 | 2 |
| 2 | 4 | 3 |

TABLE 2-2

Mapping table of the reference resource block offset

| TCI State | Transmission occasion Index | Ref_RB_offset |
|---|---|---|
| 1 | 1 | 0 |
| 2 | 2 | 1 |
| 1 | 3 | 2 |
| 2 | 4 | 3 |

TABLE 2-3

Mapping table of the reference resource block offset

| TCI State | Transmission occasion Index | Ref_RB_offset |
|---|---|---|
| 1 | 1 | 0 |
| 1 | 2 | 1 |
| 1 | 3 | 2 |
| 1 | 4 | 3 |
| 2 | 5 | 4 |
| 2 | 6 | 5 |
| 2 | 7 | 6 |
| 2 | 8 | 7 |

TABLE 2-4

Mapping table of the reference resource block offset

| TCI State | Transmission occasion Index | Ref_RB_offset |
|---|---|---|
| 1 | 1 | 0 |
| 2 | 2 | 1 |
| 1 | 3 | 2 |
| 2 | 4 | 3 |
| 1 | 5 | 4 |
| 2 | 6 | 5 |
| 1 | 7 | 6 |
| 2 | 8 | 7 |

In the case where two PTRS ports are supported, the first PTRS port is associated with the first transmission configuration indication, and the second PTRS port is associated with the second transmission configuration indication.

In one embodiment, in the case where two PTRS ports are supported, the first reference resource block offset and the second reference resource block offset may be associated with the PTRS port 0 and the PTRS port 1 respectively.

TABLE 2-5

Mapping table of the reference resource block offset

| PTRS Port | Transmission occasion Index | Ref_RB_offset |
|---|---|---|
| 0 | 1 | 0 |
| 0 | 2 | 1 |
| 1 | 3 | 2 |
| 1 | 4 | 3 |

TABLE 2-6

Mapping table of the reference resource block offset

| PTRS Port | Transmission occasion Index | Ref_RB_offset |
|---|---|---|
| 0 | 1 | 0 |
| 1 | 2 | 1 |
| 0 | 3 | 2 |
| 1 | 4 | 3 |

TABLE 2-7

Mapping table of the reference resource block offset

| PTRS Port | Transmission occasion Index | Ref_RB_offset |
|---|---|---|
| 0 | 1 | 0 |
| 0 | 2 | 1 |
| 0 | 3 | 2 |
| 0 | 4 | 3 |
| 1 | 5 | 4 |
| 1 | 6 | 5 |
| 1 | 7 | 6 |
| 1 | 8 | 7 |

TABLE 2-8

Mapping table of the reference resource block offset

| PTRS Port | Transmission occasion Index | Ref_RB_offset |
|---|---|---|
| 0 | 1 | 0 |
| 1 | 2 | 1 |
| 0 | 3 | 2 |
| 1 | 4 | 3 |
| 0 | 5 | 4 |
| 1 | 6 | 5 |
| 0 | 7 | 6 |
| 1 | 8 | 7 |

In one embodiment, the frequency domain position of the first PTRS and the frequency domain position of the second PTRS may be calculated according to the following formula:

$$k = \text{Ref\_RE} + (i * \text{K\_PTRS} + \text{Ref\_RB} + \text{Ref\_RB\_offset}) * \text{N\_SC}; \text{ or}$$

$$k = \begin{cases} \text{Ref\_RE} + (i * \text{K\_PTRS} + \text{Ref\_RB} + \text{Ref\_RB\_offset}) * \text{N\_SC}, & \text{if } A \\ \text{Ref\_RE} + (i * \text{K\_PTRS} + \text{Ref\_RB}) * \text{N\_SC}, & \text{if } B \end{cases}.$$

A may denote that the transmission occasion index is not 1. B may denote that the transmission occasion index is 1. k denotes the PTRS frequency domain position. Ref_RE denotes the reference resource element. K_PTRS denotes the PTRS frequency domain density. Ref_RB denotes the reference resource block. i denotes the directory index of an actually scheduled PTRS in the frequency domain. N_SC denotes the number of subcarriers in each resource block. Ref_RB_offset denotes the reference resource block offset.

Ref_RB_offset may be acquired according to the preceding configuration method.

Example 4

A position determination method for a reference signal resource includes that a first communication node determines the frequency domain position of a first PTRS and the frequency domain position of a second PTRS according to indication information and a predefined mapping relationship.

The indication information includes the size of the first resource block, the size of the second resource block, the resource block index of the first PTRS, the resource block index of the second PTRS, the port number of the first DMRS, the port number of the second DMRS, the resource configuration type of the first DMRS, the resource configuration type of the second DMRS, the first transmission configuration indication, the radio network temporary identifier, the radio network temporary identifier when the second communication node transmits data, the number of subcarriers in each resource block, the size of a precoding resource block group, the first transmission occasion index and the second transmission occasion index.

The predefined mapping relationship includes the mapping relationship between the PTRS frequency domain density and the scheduled bandwidth; the mapping relationship between the port number of the demodulation reference signal, the resource configuration type of the demodulation reference signal and the reference resource element; the mapping relationship between the PTRS frequency domain density, the size of the scheduled resource block, the radio network temporary identifier and the reference resource block; the mapping relationship between the transmission occasion index, the transmission configuration indication and the reference resource element offset; the mapping relationship between the transmission occasion index, the PTRS port and the reference resource element offset; and the mapping relationship between the reference resource element offset, the reference resource element, the reference resource block, the PTRS frequency domain density, the resource block index of a PTRS, the number of subcarriers in each resource block and the PTRS frequency domain position.

The frequency domain density of the first PTRS is determined by the size of the first resource block. The frequency domain density of the second PTRS is determined by the size of the second resource block.

The first reference resource element is determined by the port number of the first DMRS, the resource configuration type of the first DMRS and the like. The second reference resource element is determined by the port number of the second DMRS, the resource configuration type of the second DMRS and the like.

The first reference resource block is determined by the frequency domain density of the first PTRS, the size of the first resource block, the radio network temporary identifier and the like.

The second reference resource block is determined by the frequency domain density of the second PTRS, the size of the second resource block, the radio network temporary identifier and the like.

The first reference resource element offset is determined by the first transmission occasion index, the first transmission configuration indication and the like. Alternatively, the first reference resource element offset is determined by the first transmission occasion index, the port number of the first PTRS and the like.

The second reference resource element offset is determined by the second transmission occasion index and the second transmission configuration indication and the like. Alternatively, the second reference resource element offset is determined by the first transmission occasion index, the port number of the second PTRS and the like.

The frequency domain position of the first PTRS is determined by the frequency domain density of the first PTRS, the first reference resource block, the first reference resource element offset, the first reference resource element, the resource block index of the first PTRS, the number of subcarriers in each resource block and the like. The frequency domain position of the second PTRS is determined by the frequency domain density of the second PTRS, the second reference resource block, the second reference resource element offset, the second reference resource element, the resource block index of the second PTRS, the number of subcarriers in each resource block and the like.

In one embodiment, the first reference resource element offset and the second reference resource element offset are configured in at least one of the following manners: the transmission occasion index is 1, and Ref_RE_offset=0; the transmission occasion index is 2, and Ref_RE_offset=1; the transmission occasion index is 3, and Ref_RE_offset=2; and the transmission occasion index is 4, and Ref_RE_offset=3; or the transmission occasion index is 1, and Ref_RE_offset=0; the transmission occasion index is 2, and Ref_RE_offset=1; the transmission occasion index is 3, and Ref_RE_offset=2; the transmission occasion index is 4, and Ref_RE_offset=3; the transmission occasion index is 5, and Ref_RE_offset=4; the transmission occasion index is 6, and Ref_RE_offset=5; the transmission occasion index is 7, and Ref_RE_offset=6; and the transmission occasion index is 8, and Ref_RE_offset=7.

When the transmission occasion index is an odd number, Ref_RE_offset denotes the first reference resource element offset; and when the transmission occasion index is an even number, Ref_RE_offset denotes the second reference resource element offset. Alternatively, when the transmission occasion index is an odd number, Ref_RE_offset denotes the second reference resource element offset; and when the transmission occasion index is an even number, Ref_RE_offset denotes the first reference resource element offset. Alternatively, for the first half of the transmission occasion index, Ref_RE_offset denotes the first reference resource element offset; and for the second half of the transmission occasion index, Ref_RE_offset denotes the second reference resource element offset. Alternatively, for the first half of the transmission occasion index, Ref_RE_offset denotes the second reference resource element offset; and for the second half of the transmission occasion index, Ref_RE_offset denotes the first reference resource element offset.

In one embodiment, the first reference resource element offset and the second reference resource element offset may be associated with two TCI states. The TCI state value of the first transmission indication is 1, representing the first communication node. The TCI state value of the second transmission indication is 2, representing the second communication node. Table 3-1 is another mapping table of the reference resource element offset provided by this example. Table 3-2 is another mapping table of the reference resource element offset provided by this example. Table 3-3 is another mapping table of the reference resource element offset provided by this example. Table 3-4 is another mapping table of the reference resource element offset provided by this example. Table 3-5 is another mapping table of the reference resource element offset provided by this example. Table 3-6 is another mapping table of the reference resource element offset provided by this example. Table 3-7 is another mapping table of the reference resource element offset provided by this example. Table 3-8 is another mapping table of the reference resource element offset provided by this example. Tables 3-1, 3-2, 3-3 and 3-4 show the mapping relationship between the reference resource element offset, the transmission occasion index and the TCI state. Tables 3-5, 3-6, 3-7 and 3-8 show the mapping relationship between the reference resource element offset, the transmission occasion index and the PTRS port.

TABLE 3-1

Mapping table of the reference resource element offset

| TCI State | Transmission occasion Index | Ref_RE_offset |
|---|---|---|
| 1 | 1 | 0 |
| 1 | 2 | 1 |
| 2 | 3 | 2 |
| 2 | 4 | 3 |

TABLE 3-2

Mapping table of the reference resource element offset

| TCI State | Transmission occasion Index | Ref_RE_offset |
|---|---|---|
| 1 | 1 | 0 |
| 2 | 2 | 1 |
| 1 | 3 | 2 |
| 2 | 4 | 3 |

TABLE 3-3

Mapping table of the reference resource element offset

| TCI State | Transmission occasion Index | Ref_RE_offset |
|---|---|---|
| 1 | 1 | 0 |
| 1 | 2 | 1 |
| 1 | 3 | 2 |
| 1 | 4 | 3 |
| 2 | 5 | 4 |
| 2 | 6 | 5 |
| 2 | 7 | 6 |
| 2 | 8 | 7 |

TABLE 3-4

Mapping table of the reference resource element offset

| TCI State | Transmission occasion Index | Ref_RE_offset |
|---|---|---|
| 1 | 1 | 0 |
| 2 | 2 | 1 |
| 1 | 3 | 2 |
| 2 | 4 | 3 |
| 1 | 5 | 4 |
| 2 | 6 | 5 |

TABLE 3-4-continued

Mapping table of the reference resource element offset

| TCI State | Transmission occasion Index | Ref_RE_offset |
|---|---|---|
| 1 | 7 | 6 |
| 2 | 8 | 7 |

In the case where two PTRS ports are supported, the first PTRS port is associated with the first transmission configuration indication, and the second PTRS port is associated with the second transmission configuration indication.

In one embodiment, in the case where two PTRS ports are supported, the first reference resource element offset and the second reference resource element offset may be associated with the PTRS port 0 and the PTRS port 1 respectively.

TABLE 3-5

Mapping table of the reference resource element offset

| PTRS Port | Transmission occasion Index | Ref_RE_offset |
|---|---|---|
| 0 | 1 | 0 |
| 0 | 2 | 1 |
| 1 | 3 | 2 |
| 1 | 4 | 3 |

TABLE 3-6

Mapping table of the reference resource element offset

| PTRS Port | Transmission occasion Index | Ref_RE_offset |
|---|---|---|
| 0 | 1 | 0 |
| 1 | 2 | 1 |
| 0 | 3 | 2 |
| 1 | 4 | 3 |

TABLE 3-7

Mapping table of the reference resource element offset

| PTRS Port | Transmission occasion Index | Ref_RE_offset |
|---|---|---|
| 0 | 1 | 0 |
| 0 | 2 | 1 |
| 0 | 3 | 2 |
| 0 | 4 | 3 |
| 1 | 5 | 4 |
| 1 | 6 | 5 |
| 1 | 7 | 6 |
| 1 | 8 | 7 |

TABLE 3-8

Mapping table of the reference resource element offset

| PTRS Port | Transmission occasion Index | Ref_RE_offset |
|---|---|---|
| 0 | 1 | 0 |
| 1 | 2 | 1 |
| 0 | 3 | 2 |
| 1 | 4 | 3 |
| 0 | 5 | 4 |
| 1 | 6 | 5 |

TABLE 3-8-continued

Mapping table of the reference resource element offset

| PTRS Port | Transmission occasion Index | Ref_RE_offset |
|---|---|---|
| 0 | 7 | 6 |
| 1 | 8 | 7 |

In one embodiment, the frequency domain position of the first PTRS and the frequency domain position of the second PTRS may be calculated according to the following formula:

$$k = \text{Ref\_RE} + \text{Ref\_RE\_offset} + (i * \text{K\_PTRS} + \text{Ref\_RB}) * \text{N\_SC}; \text{ or}$$

$$k = \begin{cases} \text{Ref\_RE} + \text{Ref\_RE\_offset} + (i * \text{K\_PTRS} + \text{Ref\_RB}) * \text{N\_SC}, & \text{if } A \\ \text{Ref\_RE} + (i * \text{K\_PTRS} + \text{Ref\_RB}) * \text{N\_SC}, & \text{if } B \end{cases}.$$

A may denote that the transmission occasion index is not 1. B may denote that the transmission occasion index is 1.

k denotes the PTRS frequency domain position. Ref_RE denotes the reference resource element. K_PTRS denotes the PTRS frequency domain density. Ref_RB denotes the reference resource block. i denotes the directory index of an actually scheduled PTRS in the frequency domain. N_SC denotes the number of subcarriers in each resource block. Ref_RE_offset denotes the reference resource block offset.

Ref_RE_offset may be acquired according to the preceding configuration method.

Example 5

A position determination method for a reference signal resource includes that a first communication node determines the frequency domain position of a first PTRS and the frequency domain position of a second PTRS according to indication information and a predefined mapping relationship.

The indication information includes the size of the first resource block, the size of the second resource block, the resource block index of the first PTRS, the resource block index of the second PTRS, the port number of the first DMRS, the port number of the second DMRS, the resource configuration type of the first DMRS, the resource configuration type of the second DMRS, the first transmission configuration indication, the radio network temporary identifier, the radio network temporary identifier when the second communication node transmits data, the number of subcarriers in each resource block, the size of a precoding resource block group, the first transmission occasion index and the second transmission occasion index.

The predefined mapping relationship includes the mapping relationship between the PTRS frequency domain density and the scheduled bandwidth; the mapping relationship between the port number of the demodulation reference signal, the resource configuration type of the demodulation reference signal and the reference resource element; the mapping relationship between the PTRS frequency domain density, the size of the scheduled resource block, the radio network temporary identifier and the reference resource block; the mapping relationship between the transmission occasion index, the transmission configuration indication, the reference resource block offset and the reference resource element offset; the mapping relationship between the transmission occasion index, the PTRS port, the reference resource block offset and the reference resource element offset; and the mapping relationship between the reference resource element offset, the reference resource block offset, the reference resource element, the reference resource block, the PTRS frequency domain density, the size of the scheduled resource block, the resource block index of a PTRS, the number of subcarriers in each resource block and the PTRS frequency domain position.

The frequency domain density of the first PTRS is determined by the size of the first resource block. The frequency domain density of the second PTRS is determined by the size of the second resource block. The first reference resource element is determined by the port number of the first DMRS, the resource configuration type of the first DMRS and the like. The second reference resource element is determined by the port number of the second DMRS, the resource configuration type of the second DMRS and the like. The first reference resource block is determined by the frequency domain density of the first PTRS, the size of the first resource block, the radio network temporary identifier and the like. The second reference resource block is determined by the frequency domain density of the second PTRS, the size of the second resource block, the radio network temporary identifier and the like.

The first reference resource block offset and the first reference resource element offset are determined by the first transmission occasion index, the first transmission configuration indication and the like. Alternatively, the first reference resource block offset and the first reference resource element offset are determined by the first transmission occasion index, the port number of the first PTRS and the like. The second reference resource block offset and the second reference resource element offset are determined by the second transmission occasion index, the second transmission configuration indication and the like. Alternatively, the second reference resource block offset and the second reference resource element offset are determined by the first transmission occasion index, the port number of the second PTRS and the like.

The frequency domain position of the first PTRS is determined by the frequency domain density of the first PTRS, the first reference resource block, the first reference resource block offset, the first reference resource element offset, the first reference resource element, the resource block index of the first PTRS, the number of subcarriers in each resource block and the like. The frequency domain position of the second PTRS is determined by the frequency domain density of the second PTRS, the second reference resource block, the second reference resource block offset, the second reference resource element offset, the second reference resource element, the resource block index of the second PTRS, the number of subcarriers in each resource block and the like.

In one embodiment, the first reference resource block offset, the first reference resource element offset, the second reference resource block offset and the second reference resource element offset are configured in at least one of the following manners: the transmission occasion index is 1, Ref_RB_offset=0 and Ref_RE_offset=0; the transmission occasion index is 2, Ref_RB_offset=0 and Ref_RE_offset=1; the transmission occasion index is 3, Ref_RB_offset=0 and Ref_RE_offset=2; and the transmission occasion index is 4, Ref_RB_offset=0 and Ref_RE_offset=3; or the transmission occasion index is 1, Ref_RB_offset=0 and Ref_RE_offset=0; the transmission occasion index is 2, Ref_RB_offset=0 and Ref_RE_offset=1; the transmission occasion index is 3, Ref_RB_offset=0 and Ref_RE_offset=2; the transmission occasion index is 4, Ref_RB_offset=0 and Ref_RE_offset=3; the transmission occasion index is 5, Ref_RB_offset=1 and Ref_RE_offset=0; the transmission occasion index is 6, Ref_RB_offset=1 and Ref_RE_offset=1; the transmission occasion index is 7, Ref_RB_offset=1 and Ref_RE_offset=2; and the transmission occasion index is 8, Ref_RB_offset=1 and Ref_RE_offset=3.

When the transmission occasion index is an odd number, Ref_RB_offset and Ref_RE_offset denote the first reference resource block offset and the first reference resource element offset respectively; and when the transmission occasion index is an even number, Ref_RB_offset and Ref_RE_offset denote the second reference resource block offset and the second reference resource element offset respectively.

Alternatively, when the transmission occasion index is an odd number, Ref_RB_offset and Ref_RE_offset denotes the second reference resource block offset and the second reference resource element offset respectively; and when the transmission occasion index is an even number, Ref_RB_offset and Ref_RE_offset denotes the first reference resource block offset and the first reference resource element offset respectively.

Alternatively, for the first half of the transmission occasion index, Ref_RB_offset and Ref_RE_offset denote the first reference resource block offset and the first reference resource element offset respectively; and for the second half of the transmission occasion index, Ref_RB_offset and Ref_RE_offset denote the second reference resource block offset and the second reference resource element offset respectively.

Alternatively, for the first half of the transmission occasion index, Ref_RB_offset and Ref_RE_offset denote the second reference resource block offset and the second reference resource element offset respectively; and for the second half of the transmission occasion index, Ref_RB_offset and Ref_RE_offset denote the first reference resource block offset and the first reference resource element offset respectively.

In one embodiment, the first reference resource block offset and reference resource element offset, and the second reference resource element offset and reference resource element offset are associated with the first transmission configuration indication and the second transmission configuration indication respectively. The TCI state value of the first transmission indication is 1, representing the first communication node. The TCI state value of the second transmission indication is 2, representing the second communication node. Table 4-1 is a mapping table of the reference resource block offset and the reference resource element offset provided by this example. Table 4-2 is another mapping table of the reference resource block offset and the reference resource element offset provided by this example. Table 4-3 is another mapping table of the reference resource block offset and the reference resource element offset provided by this example. Table 4-4 is another mapping table of the reference resource block offset and the reference resource element offset provided by this example. Table 4-5 is another mapping table of the reference resource block offset and the reference resource element offset provided by this example. Table 4-6 is another mapping table of the reference resource block offset and the reference resource element offset provided by this example. Table 4-7 is another mapping table of the reference resource block offset and the reference resource element offset provided by this example. Table 4-8 is another mapping table of the reference resource block offset and the reference resource element offset provided by this example.

Tables 4-1, 4-2, 4-3 and 4-4 show the mapping relationship between the reference resource block offset, the reference resource element offset, the transmission occasion index and the TCI state. Tables 4-5, 4-6, 4-7 and 4-8 show the mapping relationship between the reference resource block offset, the reference resource element offset, the transmission occasion index and the PTRS port.

TABLE 4-1

Mapping table of the reference resource block offset and the reference resource element offset

| TCI State | Transmission occasion Index | Ref_RB_offset | Ref_RE_offset |
|---|---|---|---|
| 1 | 1 | 0 | 0 |
| 1 | 2 | 0 | 1 |
| 2 | 3 | 1 | 0 |
| 2 | 4 | 1 | 1 |

TABLE 4-2

Mapping table of the reference resource block offset and the reference resource element offset

| TCI State | Transmission occasion Index | Ref_RB_offset | Ref_RE_offset |
|---|---|---|---|
| 1 | 1 | 0 | 0 |
| 2 | 2 | 0 | 1 |
| 1 | 3 | 1 | 0 |
| 2 | 4 | 1 | 1 |

TABLE 4-3

Mapping table of the reference resource block offset and the reference resource element offset

| TCI State | Transmission occasion Index | Ref_RB_offset | Ref_RE_offset |
|---|---|---|---|
| 1 | 1 | 0 | 0 |
| 1 | 2 | 0 | 1 |
| 1 | 3 | 0 | 2 |
| 1 | 4 | 0 | 3 |
| 2 | 5 | 1 | 0 |
| 2 | 6 | 1 | 1 |
| 2 | 7 | 1 | 2 |
| 2 | 8 | 1 | 3 |

TABLE 4-4

Mapping table of the reference resource block offset and the reference resource element offset

| TCI State | Transmission occasion Index | Ref_RB_offset | Ref_RE_offset |
|---|---|---|---|
| 1 | 1 | 0 | 0 |
| 2 | 2 | 0 | 1 |
| 1 | 3 | 0 | 2 |
| 2 | 4 | 0 | 3 |
| 1 | 5 | 1 | 0 |
| 2 | 6 | 1 | 1 |
| 1 | 7 | 1 | 2 |
| 2 | 8 | 1 | 3 |

In the case where two PTRS ports are supported, the first PTRS port is associated with the first transmission configuration indication, and the second PTRS port is associated with the second transmission configuration indication.

In one embodiment, in the case where two PTRS ports are supported, the first reference resource block offset and reference resource element offset, and the second reference resource block offset and reference resource element offset may be associated with the PTRS port 0 and the PTRS port 1 respectively.

TABLE 4-5

Mapping table of the reference resource block offset and the reference resource element offset

| PTRS Port | Transmission occasion Index | Ref_RB_offset | Ref_RE_offset |
|---|---|---|---|
| 0 | 1 | 0 | 0 |
| 0 | 2 | 0 | 1 |
| 1 | 3 | 1 | 0 |
| 1 | 4 | 1 | 1 |

TABLE 4-6

Mapping table of the reference resource block offset and the reference resource element offset

| PTRS Port | Transmission occasion Index | Ref_RB_offset | Ref_RE_offset |
|---|---|---|---|
| 0 | 1 | 0 | 0 |
| 1 | 2 | 0 | 1 |
| 0 | 3 | 1 | 0 |
| 1 | 4 | 1 | 1 |

TABLE 4-7

Mapping table of the reference resource block offset and the reference resource element offset

| PTRS Port | Transmission occasion Index | Ref_RB_offset | Ref_RE_offset |
|---|---|---|---|
| 0 | 1 | 0 | 0 |
| 0 | 2 | 0 | 1 |
| 0 | 3 | 0 | 2 |
| 0 | 4 | 0 | 3 |
| 1 | 5 | 1 | 0 |
| 1 | 6 | 1 | 1 |
| 1 | 7 | 1 | 2 |
| 1 | 8 | 1 | 3 |

TABLE 4-8

Mapping table of the reference resource block offset and the reference resource element offset

| PTRS Port | Transmission occasion Index | Ref_RB_offset | Ref_RE_offset |
|---|---|---|---|
| 0 | 1 | 0 | 0 |
| 1 | 2 | 0 | 1 |
| 0 | 3 | 0 | 2 |
| 1 | 4 | 0 | 3 |
| 0 | 5 | 1 | 0 |
| 1 | 6 | 1 | 1 |
| 0 | 7 | 1 | 2 |
| 1 | 8 | 1 | 3 |

In one embodiment, the frequency domain position of the first PTRS and the frequency domain position of the second PTRS may be calculated according to the following formula:

$$k = \text{Ref\_RE} + \text{Ref\_RB\_offset}(i*\text{K\_PTRS} + \text{Ref\_RB} + \text{Ref\_RB\_offset})*\text{N\_SC; or}$$

$$k = \begin{cases} \text{Ref\_RE} + \text{Ref\_RE\_offset} + \\ (i*\text{K\_PTRS} + \text{Ref\_RB} + \text{Ref\_RB\_offset})*\text{N\_SC, if } A. \\ \text{Ref\_RE} + (i*\text{K\_PTRS} + \text{Ref\_RB})*\text{N\_SC, if } B \end{cases}$$

A may denote that the transmission occasion index is not 1. B may denote that the transmission occasion index is 1.

k denotes the PTRS frequency domain position. Ref_RE denotes the reference resource element. K_PTRS denotes the PTRS frequency domain density. Ref_RB denotes the reference resource block. i denotes the directory index of an actually scheduled PTRS in the frequency domain. N_SC denotes the number of subcarriers in each resource block. Ref_RB_offset denotes the reference resource block offset. Ref_RE_offset denotes the reference resource element offset.

Ref_RB_offset and Ref_RE_offset are acquired according to the preceding configuration method.

Example 6

A position determination method for a reference signal resource includes that a first communication node determines the frequency domain position of a first PTRS and the frequency domain position of a second PTRS according to indication information and a predefined mapping relationship.

The indication information includes the size of the first resource block, the size of the second resource block, the resource block index of the first PTRS, the resource block index of the second PTRS, the port number of the first DMRS, the port number of the second DMRS, the resource configuration type of the first DMRS, the resource configuration type of the second DMRS, the first spatial relationship information, the second spatial relationship information, the radio network temporary identifier, the number of subcarriers in each resource block and the size of a precoding resource block group.

The predefined mapping relationship includes the mapping relationship between the PTRS frequency domain density and the scheduled bandwidth; the mapping relationship between the port number of the demodulation reference signal, the resource configuration type of the demodulation reference signal and the reference resource element; the mapping relationship between the PTRS frequency domain density, the size of the scheduled resource block, the radio network temporary identifier and the reference resource block; the mapping relationship between the size of a precoding resource block group, the PTRS frequency domain density, the spatial relationship information and the reference resource block offset; the mapping relationship between the size of a precoding resource block group, the PTRS frequency domain density, the PTRS port and the reference resource block offset; and the mapping relationship between the reference resource block offset, the reference resource element, the reference resource block, the PTRS frequency domain density, the size of the scheduled resource block, the PTRS resource block index, the number of subcarriers in each resource block and the PTRS frequency domain position.

The frequency domain density of the first PTRS and the frequency domain density of the second PTRS are determined by the sum of the size of the first resource block and the size of the second resource block.

The first reference resource element and the second reference resource element are determined by the port number of the first DMRS, the resource configuration type of the first DMRS and the like. Alternatively, the first reference resource element and the second reference resource element are determined by the port number of the second DMRS, the resource configuration type of the second DMRS and the like. Alternatively, the first reference resource element and the second reference resource element are determined by the DMRS port number of a communication node having a smaller scheduled resource block of two communication nodes, the DMRS resource configuration type of the communication node having a smaller scheduled resource block and the like. Alternatively, the first reference resource element and the second reference resource element are determined by the DMRS port number of a communication node having a larger scheduled resource block of two communication nodes, the DMRS resource configuration type of the communication node having a larger scheduled resource block and the like.

The first reference resource block and the second reference resource block are determined by the frequency domain density of the first PTRS, the size of the first resource block, the radio network temporary identifier and the like. Alternatively, the first reference resource block and the second reference resource block are determined by the frequency domain density of the first PTRS, the size of the second resource block, the radio network temporary identifier and the like. Alternatively, the first reference resource block and the second reference resource block are determined by the frequency domain density of the first PTRS, the size of a resource block having a larger scheduled resource block in two communication nodes, the radio network temporary identifier and the like. Alternatively, the first reference resource block and the second reference resource block are determined by the frequency domain density of the first PTRS, the size of a resource block having a smaller scheduled resource block in two communication nodes, the radio network temporary identifier and the like.

The first reference resource block offset is determined by the size of a precoding resource block group, the frequency domain density of the first PTRS, the first spatial relationship information and the like. Alternatively, the first reference resource block offset is determined by the size of a precoding resource block group, the frequency domain density of the first PTRS, the port number of the first DMRS and the like.

The second reference resource block offset is determined by the size of a precoding resource block group, the frequency domain density of the second PTRS, the second spatial relationship information and the like. Alternatively, the second reference resource block offset is determined by the size of a precoding resource block group, the frequency domain density of the second PTRS, the port number of the second DMRS and the like.

The first spatial relationship information and the second spatial relationship information may be determined by the RRC signaling, the MAC-CE signaling or the DCI signaling.

The frequency domain position of the first PTRS is determined by the frequency domain density of the first PTRS, the first reference resource block, the first reference resource block offset, the first reference resource element, the resource block index of the first PTRS, the number of subcarriers in each resource block and the like.

The frequency domain position of the second PTRS is determined by the frequency domain density of the second PTRS, the second reference resource block, the second reference resource block offset, the second reference resource element, the resource block index of the second PTRS, the number of subcarriers in each resource block and the like.

In one embodiment, the first reference resource block offset and the second reference resource block offset are configured in at least one of the following manners: in the case where K_PTRS=4 and PRG_size=2, Ref_RB_offset1=0 and Ref_RB_offset2=2; in the case where K_PTRS=4 and PRG_size=2, Ref_RB_offset1=2 and Ref_RB_offset2=0; in the case where K_PTRS=4 and PRG_size=2, Ref_RB_offset1=0 and Ref_RB_offset2=1; in the case where K_PTRS=4 and PRG_size=2, Ref_RB_offset1=1 and Ref_RB_offset2=0; in the case where K_PTRS=4 and PRG_size=4, Ref_RB_offset1=0 and Ref_RB_offset2=0; in the case where K_PTRS=2 and PRG_size=2, Ref_RB_offset1=0 and Ref_RB_offset2=0; in the case where K_PTRS=2 and PRG_size=4, Ref_RB_offset1=0 and Ref_RB_offset2=0; in the case where K_PTRS=4 and PRG_size is wideband, Ref_RB_offset1=0 and Ref_RB_offset2=0; or in the case where K_PTRS=2 and PRG_size is wideband, Ref_RB_offset1=0 and Ref_RB_offset2=0.

K_PTRS denotes the frequency domain density of the first PTRS and the frequency domain density of the second PTRS. PRG_size denotes the size of a precoding resource block group. Ref_RB_offset1 and Ref_RB_offset2 denote the first reference resource block offset and the second reference resource block offset respectively.

In one embodiment, the first reference resource block offset and the second reference resource block offset are associated with the first spatial relationship information and the second spatial relationship information respectively. The value of SpatialRelationInfor of the first spatial relationship information is 1, representing the first communication node. The value of SpatialRelationInfor of the second spatial relationship information is 2, representing the second communication node. Table 5-1 is another mapping table of the reference resource block offset provided by this example. Table 5-2 is another mapping table of the reference resource block offset provided by this example.

Table 5-1 shows the mapping relationship between the reference resource block offsets, K_PTRS, PRG_size and SpatialRelationInfor. Table 5-2 shows the mapping relationship between the reference resource block offset, K_PTRS, PRG_size and the PTRS port.

TABLE 5-1

Mapping table of the reference resource block offset

| SpatialRelationInfor | PRG_size | K_PTRS | Ref_RB_offset |
|---|---|---|---|
| 1 | 2 | 2 | 0 |
| 2 | 2 | 2 | 0 |
| 1 | 2 | 4 | 0 |
| 2 | 2 | 4 | 2 |
| 1 | 2 | 4 | 2 |
| 2 | 2 | 4 | 0 |
| 2 | 2 | 4 | 1 |
| 1 | 2 | 4 | 1 |
| 1 | 4 | 2 | 0 |
| 2 | 4 | 2 | 0 |
| 1 | 4 | 4 | 0 |
| 2 | 4 | 4 | 0 |
| 1 | Wideband | 2 | 0 |
| 2 | Wideband | 2 | 0 |
| 1 | Wideband | 4 | 0 |
| 2 | Wideband | 4 | 0 |
| 1 | 2 | 2 | 0 |
| 2 | 2 | 2 | 0 |

In the case where two PTRS ports are supported, the first PTRS port is associated with the first spatial relationship information, and the second PTRS port is associated with the second spatial relationship information.

In one embodiment, in the case where two PTRS ports are supported, the first reference resource block offset and the second reference resource block offset may be associated with the PTRS port 0 and the PTRS port 1 respectively.

TABLE 5-2

Mapping table of the reference resource block offset

| PTRS Port | PRG_size | K_PTRS | Ref_RB_offset |
|---|---|---|---|
| 0 | 2 | 2 | 0 |
| 1 | 2 | 2 | 0 |
| 0 | 2 | 4 | 0 |
| 1 | 2 | 4 | 2 |
| 0 | 2 | 4 | 2 |
| 1 | 2 | 4 | 0 |
| 1 | 2 | 4 | 1 |
| 0 | 2 | 4 | 1 |
| 0 | 4 | 2 | 0 |
| 1 | 4 | 2 | 0 |
| 1 | 4 | 4 | 0 |
| 0 | 4 | 4 | 0 |
| 0 | Wideband | 2 | 0 |
| 1 | Wideband | 2 | 0 |
| 0 | Wideband | 4 | 0 |
| 1 | Wideband | 4 | 0 |
| 0 | 2 | 2 | 0 |
| 1 | 2 | 2 | 0 |

In one embodiment, the frequency domain position of the first PTRS and the frequency domain position of the second PTRS may be calculated according to the following formula:

$$k = \text{Ref\_RE} + (i*\text{K\_PTRS} + \text{Ref\_RB} + \text{Ref\_RB\_offset})*\text{N\_SC; or}$$

$$k = \begin{cases} \text{Ref\_RE} + (i*\text{K\_PTRS} + \text{Ref\_RB} + \text{Ref\_RB\_offset})*\text{N\_SC, if } A \\ \text{Ref\_RE} + (i*\text{K\_PTRS} + \text{Ref\_RB})*\text{N\_SC, if } B \end{cases}$$

A may denote PGR_size=2 and K_PTRS=4. B may denote PGR_size=2 and K_PTRS=2, PGR_size=4 and K_PTRS=2, PRG_size being wideband and K_PTRS=2 or PRG_size being wideband and K_PTRS=4.

k denotes the PTRS frequency domain position. Ref_RE denotes the reference resource element. K_PTRS denotes the PTRS frequency domain density. Ref_RB denotes the reference resource block. i denotes the directory index of an actually scheduled PTRS in the frequency domain. N_SC denotes the number of subcarriers in each resource block. Ref_RB_offset denotes the reference resource block offset.

Ref_RB_offset is acquired according to the preceding configuration method.

Example 7

A position determination method for a reference signal resource includes that a first communication node determines the frequency domain position of a first PTRS and the frequency domain position of a second PTRS according to indication information and a predefined mapping relationship.

The indication information includes the size of the first resource block, the size of the second resource block, the resource block index of the first PTRS, the resource block index of the second PTRS, the port number of the first DMRS, the port number of the second DMRS, the resource configuration type of the first DMRS, the resource configuration type of the second DMRS, the first spatial relationship information, the second spatial relationship information, the radio network temporary identifier, the number of subcarriers in each resource block, the size of a precoding resource block group, the first transmission occasion index and the second transmission occasion index.

The predefined mapping relationship includes the mapping relationship between the PTRS frequency domain density and the scheduled bandwidth; the mapping relationship between the port number of the demodulation reference signal, the resource configuration type of the demodulation reference signal and the reference resource element; the mapping relationship between the PTRS frequency domain density, the size of the scheduled resource block, the radio network temporary identifier and the reference resource block; the mapping relationship between the transmission occasion index, the spatial relationship information and the reference resource block offset; the mapping relationship between the transmission occasion index, the PTRS port and the reference resource block offset; and the mapping relationship between the reference resource block offset, the reference resource element, the reference resource block, the PTRS frequency domain density, the size of the scheduled resource block, the resource block index of a PTRS, the number of subcarriers in each resource block and the PTRS frequency domain position.

The frequency domain density of the first PTRS is determined by the size of the first resource block.

The frequency domain density of the second PTRS is determined by the size of the second resource block.

The first reference resource element is determined by the port number of the first DMRS, the resource configuration type of the first DMRS and the like.

The second reference resource element is determined by the port number of the second DMRS, the resource configuration type of the second DMRS and the like.

The first reference resource block is determined by the frequency domain density of the first PTRS, the size of the first resource block, the radio network temporary identifier and the like.

The second reference resource block is determined by the frequency domain density of the second PTRS, the size of the second resource block, the radio network temporary identifier and the like.

The first reference resource block offset is determined by the first transmission occasion index, the first spatial relationship information and the like. Alternatively, the first reference resource block offset is determined by the first transmission occasion index, the port number of the first PTRS and the like. The second reference resource block offset is determined by the second transmission occasion index, the second spatial relationship information and the like. Alternatively, the second reference resource block offset is determined by the first transmission occasion index, the port number of the second PTRS and the like. The spatial relationship information and the second spatial relationship information may be determined by the RRC signaling, the MAC-CE signaling or the DCI signaling.

The frequency domain position of the first PTRS is determined by the frequency domain density of the first PTRS, the first reference resource block, the first reference resource block offset, the first reference resource element, the resource block index of the first PTRS, the number of subcarriers in each resource block and the like.

The frequency domain position of the second PTRS is determined by the frequency domain density of the second PTRS, the second reference resource block, the second reference resource block offset, the second reference resource element, the resource block index of the second PTRS, the number of subcarriers in each resource block and the like.

In one embodiment, the first reference resource block offset and the second reference resource block offset are configured in at least one of the following manners: the transmission occasion index is 1, and Ref_RB_offset=0; the transmission occasion index is 2, and Ref_RB_offset=1; the transmission occasion index is 3, and Ref_RB_offset=2; and the transmission occasion index is 4, and Ref_RB_offset=3; or the transmission occasion index is 1, and Ref_RB_offset=0; the transmission occasion index is 2, and Ref_RB_offset=1; the transmission occasion index is 3, and Ref_RB_offset=2; the transmission occasion index is 4, and Ref_RB_offset=3; the transmission occasion index is 5, and Ref_RB_offset=4; the transmission occasion index is 6, and Ref_RB_offset=5; the transmission occasion index is 7, and Ref_RB_offset=6; and the transmission occasion index is 8, and Ref_RB_offset=7.

When the transmission occasion index is an odd number, Ref_RB_offset denotes the first reference resource block offset; and when the transmission occasion index is an even number, Ref_RB_offset denotes the second reference resource block offset.

Alternatively, when the transmission occasion index is an odd number, Ref_RB_offset denotes the second reference resource block offset; and when the transmission occasion index is an even number, Ref_RB_offset denotes the first reference resource block offset.

Alternatively, for the first half of the transmission occasion index, Ref_RB_offset denotes the first reference resource block offset; and for the second half of the transmission occasion index, Ref_RB_offset denotes the second reference resource block offset.

Alternatively, for the first half of the transmission occasion index, Ref_RB_offset denotes the second reference resource block offset; and for the second half of the transmission occasion index, Ref_RB_offset denotes the first reference resource block offset.

In one embodiment, the first reference resource block offset and the second reference resource element offset are associated with the first spatial relationship information and the second spatial relationship information respectively. The value of SpatialRelationInfor of the first spatial relationship information is 1, representing the first communication node. The value of SpatialRelationInfor of the second spatial relationship information is 2, representing the second communication node. Table 6-1 is another mapping table of the reference resource block offset provided by this example. Table 6-2 is another mapping table of the reference resource block offset provided by this example. Table 6-3 is another mapping table of the reference resource block offset provided by this example. Table 6-4 is another mapping table of the reference resource block offset provided by this example. Table 6-5 is another mapping table of the reference resource block offset provided by this example. Table 6-6 is another mapping table of the reference resource block offset provided by this example. Table 6-7 is another mapping table of the reference resource block offset provided by this example. Table 6-8 is another mapping table of the reference resource block offset provided by this example. Tables 6-1, 6-2, 6-3 and 6-4 show the mapping relationship between the reference resource block offset, the transmission occasion index and SpatialRelationInfor. Tables 6-5, 6-6, 6-7 and 6-8 show the mapping relationship between the reference resource block offset, the transmission occasion index and the PTRS port.

TABLE 6-1

Mapping table of the reference resource block offset

| SpatialRelationInfor | Transmission occasion Index | Ref_RB_offset |
|---|---|---|
| 1 | 1 | 0 |
| 1 | 2 | 1 |
| 2 | 3 | 2 |
| 2 | 4 | 3 |

TABLE 6-2

Mapping table of the reference resource block offset

| SpatialRelationInfor | Transmission occasion Index | Ref_RB_offset |
|---|---|---|
| 1 | 1 | 0 |
| 2 | 2 | 1 |
| 1 | 3 | 2 |
| 2 | 4 | 3 |

TABLE 6-3

Mapping table of the reference resource block offset

| SpatialRelatio nInfor | Transmission occasion Index | Ref_RB_offset |
|---|---|---|
| 1 | 1 | 0 |
| 1 | 2 | 1 |
| 1 | 3 | 2 |
| 1 | 4 | 3 |
| 2 | 5 | 4 |
| 2 | 6 | 5 |
| 2 | 7 | 6 |
| 2 | 8 | 7 |

TABLE 6-4

Mapping table of the reference resource block offset

| SpatialRelationInfor | Transmission occasion Index | Ref_RB_offset |
|---|---|---|
| 1 | 1 | 0 |
| 2 | 2 | 1 |
| 1 | 3 | 2 |
| 2 | 4 | 3 |
| 1 | 5 | 4 |
| 2 | 6 | 5 |
| 1 | 7 | 6 |
| 2 | 8 | 7 |

In the case where two PTRS ports are supported, the first PTRS port is associated with the first spatial relationship information, and the second PTRS port is associated with the second spatial relationship information.

In one embodiment, in the case where two PTRS ports are supported, the first reference resource block offset and the second reference resource block offset may be associated with the PTRS port 0 and the PTRS port 1 respectively.

TABLE 6-5

Mapping table of the reference resource block offset

| PTRS Port | Transmission occasion Index | Ref_RB_offset |
|---|---|---|
| 0 | 1 | 0 |
| 0 | 2 | 1 |
| 1 | 3 | 2 |
| 1 | 4 | 3 |

TABLE 6-6

Mapping table of the reference resource block offset

| PTRS Port | Transmission occasion Index | Ref_RB_offset |
|---|---|---|
| 0 | 1 | 0 |
| 1 | 2 | 1 |
| 0 | 3 | 2 |
| 1 | 4 | 3 |

TABLE 6-7

Mapping table of the reference resource block offset

| PTRS Port | Transmission occasion Index | Ref_RB_offset |
|---|---|---|
| 0 | 1 | 0 |
| 0 | 2 | 1 |
| 0 | 3 | 2 |
| 0 | 4 | 3 |
| 1 | 5 | 4 |
| 1 | 6 | 5 |
| 1 | 7 | 6 |
| 1 | 8 | 7 |

TABLE 6-8

Mapping table of the reference resource block offset

| PTRS Port | Transmission occasion Index | Ref_RB_offset |
|---|---|---|
| 0 | 1 | 0 |
| 1 | 2 | 1 |
| 0 | 3 | 2 |
| 1 | 4 | 3 |
| 0 | 5 | 4 |
| 1 | 6 | 5 |
| 0 | 7 | 6 |
| 1 | 8 | 7 |

In one embodiment, the frequency domain position of the first PTRS and the frequency domain position of the second PTRS may be calculated according to the following formula:

$$k = \text{Ref\_RE} + (i * \text{K\_PTRS} + \text{Ref\_RB} + \text{Ref\_RB\_offset}) * \text{N\_SC; or}$$

$$k = \begin{cases} \text{Ref\_RE} + (i * \text{K\_PTRS} + \text{Ref\_RB} + \text{Ref\_RB\_offset}) * \text{N\_SC, if } A \\ \text{Ref\_RE} + (i * \text{K\_PTRS} + \text{Ref\_RB}) * \text{N\_SC, if } B \end{cases}.$$

A may denote that the transmission occasion index is not 1. B may denote that the transmission occasion index is 1.

k denotes the PTRS frequency domain position. Ref_RE denotes the reference resource element. K_PTRS denotes the PTRS frequency domain density. Ref_RB denotes the reference resource block. i denotes the directory index of an actually scheduled PTRS in the frequency domain. N_SC denotes the number of subcarriers in each resource block. Ref_RB_offset denotes the reference resource block offset.

Ref_RB_offset is acquired according to the preceding configuration method.

Example 8

A position determination method for a reference signal resource includes that a first communication node determines the frequency domain position of a first PTRS and the frequency domain position of a second PTRS according to indication information and a predefined mapping relationship.

The indication information includes the size of the first resource block, the size of the second resource block, the resource block index of the first PTRS, the resource block index of the second PTRS, the port number of the first DMRS, the port number of the second DMRS, the resource configuration type of the first DMRS, the resource configuration type of the second DMRS, the first spatial relationship information, the radio network temporary identifier, the number of subcarriers in each resource block, the size of a precoding resource block group, the first transmission occasion index and the second transmission occasion index.

The predefined mapping relationship includes the mapping relationship between the PTRS frequency domain density and the scheduled bandwidth; the mapping relationship between the port number of the demodulation reference signal, the resource configuration type of the demodulation reference signal and the reference resource element; the mapping relationship between the PTRS frequency domain density, the size of the scheduled resource block, the radio network temporary identifier and the reference resource block; the mapping relationship between the transmission occasion index, the spatial relationship information and the reference resource element offset; the mapping relationship between the transmission occasion index, the PTRS port and the reference resource element offset; and the mapping relationship between the reference resource element offset, the reference resource element, the reference resource block, the PTRS frequency domain density, the size of the scheduled resource block, the resource block index of a PTRS, the number of subcarriers in each resource block and the PTRS frequency domain position.

The frequency domain density of the first PTRS is determined by the size of the first resource block. The frequency domain density of the second PTRS is determined by the size of the second resource block. The first reference resource element is determined by the port number of the first DMRS, the resource configuration type of the first DMRS and the like. The second reference resource element is determined by the port number of the second DMRS, the resource configuration type of the second DMRS and the like. The first reference resource block is determined by the frequency domain density of the first PTRS, the size of the first resource block, the radio network temporary identifier and the like. The second reference resource block is determined by the frequency domain density of the second PTRS, the size of the second resource block, the radio network temporary identifier and the like.

The first reference resource element offset is determined by the first transmission occasion index, the first spatial relationship information and the like. Alternatively, the first reference resource element offset is determined by the first transmission occasion index, the port number of the first PTRS and the like.

The second reference resource element offset is determined by the second transmission occasion index, the second spatial relationship information and the like. Alternatively, the second reference resource element offset is determined by the first transmission occasion index, the port number of the second PTRS and the like.

The frequency domain position of the first PTRS is determined by the frequency domain density of the first PTRS, the first reference resource block, the first reference resource element offset, the first reference resource element, the resource block index of the first PTRS, the number of subcarriers in each resource block and the like.

The frequency domain position of the second PTRS is determined by the frequency domain density of the second PTRS, the second reference resource block, the second reference resource element offset, the second reference resource element, the resource block index of the second PTRS, the number of subcarriers in each resource block and the like.

In one embodiment, the first reference resource element offset and the second reference resource element offset are configured in at least one of the following manners: the transmission occasion index is 1, and Ref_RE_offset=0; the transmission occasion index is 2, and Ref_RE_offset=1; the transmission occasion index is 3, and Ref_RE_offset=2; and the transmission occasion index is 4, and Ref_RE_offset=3; or the transmission occasion index is 1, and Ref_RE_offset=0; the transmission occasion index is 2, and Ref_RE_offset=1; the transmission occasion index is 3, and Ref_RE_offset=2; the transmission occasion index is 4, and Ref_RE_offset=3; the transmission occasion index is 5, and Ref_RE_offset=4; the transmission occasion index is 6, and Ref_RE_offset=5; the transmission occasion index is 7, and Ref_RE_offset=6; and the transmission occasion index is 8, and Ref_RE_offset=7.

When the transmission occasion index is an odd number, Ref_RE_offset denotes the first reference resource element offset; and when the transmission occasion index is an even number, Ref_RE_offset denotes the second reference resource element offset.

Alternatively, when the transmission occasion index is an odd number, Ref_RE_offset denotes the second reference resource element offset; and when the transmission occasion index is an even number, Ref_RE_offset denotes the first reference resource element offset.

Alternatively, for the first half of the transmission occasion index, Ref_RE_offset denotes the first reference resource element offset; and for the second half of the transmission occasion index, Ref_RE_offset denotes the second reference resource element offset.

Alternatively, for the first half of the transmission occasion index, Ref_RE_offset denotes the second reference resource element offset; and for the second half of the transmission occasion index, Ref_RE_offset denotes the first reference resource element offset.

In one embodiment, the first reference resource element offset and the second reference resource element offset may be associated with two pieces of spatial relationship information, that is, SpatialRelationInfor. The value of SpatialRelationInfor of the first spatial relationship information is 1, representing the first communication node. The value of SpatialRelationInfor of the second spatial relationship information is 2, representing the second communication node. Table 8-1 is a mapping table of the reference resource element offset provided by this example. Table 8-2 is another mapping table of the reference resource element offset provided by this example. Table 8-3 is another mapping table of the reference resource element offset provided by this example. Table 8-4 is another mapping table of the reference resource element offset provided by this example. Table 8-5 is another mapping table of the reference resource element offset provided by this example. Table 8-6 is another mapping table of the reference resource element offset provided by this example. Table 8-7 is another mapping table of the reference resource element offset provided by this example. Table 8-8 is another mapping table of the reference resource element offset provided by this example. Tables 8-1, 8-2, 8-3 and 8-4 show the mapping relationship between the reference resource element offset, the transmission occasion index and SpatialRelationInfor. Tables 8-5, 8-6, 8-7 and 8-8 show the mapping relationship between the reference resource element offset, the transmission occasion index and the PTRS port.

TABLE 8-1

Mapping table of the reference resource element offset

| SpatialRelationInfor | Transmission occasion Index | Ref_RE_offset |
| --- | --- | --- |
| 1 | 1 | 0 |
| 1 | 2 | 1 |
| 2 | 3 | 2 |
| 2 | 4 | 3 |

TABLE 8-2

Mapping table of the reference resource element offset

| Spatial-RelationInfor | Transmission occasion Index | Ref_RE_offset |
| --- | --- | --- |
| 1 | 1 | 0 |
| 2 | 2 | 1 |

TABLE 8-2-continued

Mapping table of the reference resource element offset

| Spatial-RelationInfor | Transmission occasion Index | Ref_RE_offset |
|---|---|---|
| 1 | 3 | 2 |
| 2 | 4 | 3 |

TABLE 8-3

Mapping table of the reference resource element offset

| Spatial-RelationInfor | Transmission occasion Index | Ref_RE_offset |
|---|---|---|
| 1 | 1 | 0 |
| 1 | 2 | 1 |
| 1 | 3 | 2 |
| 1 | 4 | 3 |
| 2 | 5 | 4 |
| 2 | 6 | 5 |
| 2 | 7 | 6 |
| 2 | 8 | 7 |

TABLE 8-4

Mapping table of the reference resource element offset

| Spatial-RelationInfor | Transmission occasion Index | Ref_RE_offset |
|---|---|---|
| 1 | 1 | 0 |
| 2 | 2 | 1 |
| 1 | 3 | 2 |
| 2 | 4 | 3 |
| 1 | 5 | 4 |
| 2 | 6 | 5 |
| 1 | 7 | 6 |
| 2 | 8 | 7 |

In the case where two PTRS ports are supported, the first PTRS port is associated with the first spatial relationship information, and the second PTRS port is associated with the second spatial relationship information.

In one embodiment, in the case where two PTRS ports are supported, the first reference resource element offset and the second reference resource element offset may be associated with the PTRS port 0 and the PTRS port 1 respectively.

TABLE 8-5

Mapping table of the reference resource element offset

| PTRS Port | Transmission occasion Index | Ref_RE_offset |
|---|---|---|
| 0 | 1 | 0 |
| 0 | 2 | 1 |
| 1 | 3 | 2 |
| 1 | 4 | 3 |

TABLE 8-6

Mapping table of the reference resource element offset

| PTRS Port | Transmission occasion Index | Ref_RE_offset |
|---|---|---|
| 0 | 1 | 0 |
| 1 | 2 | 1 |

TABLE 8-6-continued

Mapping table of the reference resource element offset

| PTRS Port | Transmission occasion Index | Ref_RE_offset |
|---|---|---|
| 0 | 3 | 2 |
| 1 | 4 | 3 |

TABLE 8-7

Mapping table of the reference resource element offset

| PTRS Port | Transmission occasion Index | Ref_RE_offset |
|---|---|---|
| 0 | 1 | 0 |
| 0 | 2 | 1 |
| 0 | 3 | 2 |
| 0 | 4 | 3 |
| 1 | 5 | 4 |
| 1 | 6 | 5 |
| 1 | 7 | 6 |
| 1 | 8 | 7 |

TABLE 8-8

Mapping table of the reference resource element offset

| PTRS Port | Transmission occasion Index | Ref_RE_offset |
|---|---|---|
| 0 | 1 | 0 |
| 1 | 2 | 1 |
| 0 | 3 | 2 |
| 1 | 4 | 3 |
| 0 | 5 | 4 |
| 1 | 6 | 5 |
| 0 | 7 | 6 |
| 1 | 8 | 7 |

In one embodiment, the frequency domain position of the first PTRS and the frequency domain position of the second PTRS may be calculated according to the following formula:

$$k = \text{Ref\_RE} + \text{Ref\_RE\_offset} + (i * \text{K\_PTRS} + \text{Ref\_RB}) * \text{N\_SC; or}$$

$$k = \begin{cases} \text{Ref\_RE} + \text{Ref\_RE\_offset} + (i * \text{K\_PTRS} + \text{Ref\_RB}) * \text{N\_SC, if } A \\ \text{Ref\_RE} + (i * \text{K\_PTRS} + \text{Ref\_RB}) * \text{N\_SC, if } B \end{cases}.$$

A may denote that the transmission occasion index is not 1. B may denote that the transmission occasion index is 1.

k denotes the PTRS frequency domain position. Ref_RE denotes the reference resource element. K_PTRS denotes the PTRS frequency domain density. Ref_RB denotes the reference resource block. i denotes the directory index of an actually scheduled PTRS in the frequency domain. N_SC denotes the number of subcarriers in each resource block. Ref_RE_offset denotes the reference resource block offset.

Ref_RE_offset is acquired according to the preceding configuration method.

Example 9

A position determination method for a reference signal resource includes that a first communication node determines the frequency domain position of a first PTRS and the frequency domain position of a second PTRS according to indication information and a predefined mapping relationship.

The indication information includes the size of the first resource block, the size of the second resource block, the resource block index of the first PTRS, the resource block index of the second PTRS, the port number of the first DMRS, the port number of the second DMRS, the resource configuration type of the first DMRS, the resource configuration type of the second DMRS, the first spatial relationship information, the radio network temporary identifier, the number of subcarriers in each resource block, the size of a precoding resource block group, the first transmission occasion index and the second transmission occasion index.

The predefined mapping relationship includes the mapping relationship between the PTRS frequency domain density and the scheduled bandwidth; the mapping relationship between the port number of the demodulation reference signal, the resource configuration type of the demodulation reference signal and the reference resource element; the mapping relationship between the PTRS frequency domain density, the size of the scheduled resource block, the radio network temporary identifier and the reference resource block; the mapping relationship between the transmission occasion index, the spatial relationship information, the reference resource block offset and the reference resource element offset; the mapping relationship between the transmission occasion index, the PTRS port, the reference resource block offset and the reference resource element offset; and the mapping relationship between the reference resource element offset, the reference resource block offset, the reference resource element, the reference resource block, the PTRS frequency domain density, the size of the scheduled resource block, the resource block index of a PTRS, the number of subcarriers in each resource block and the PTRS frequency domain position.

The frequency domain density of the first PTRS is determined by the size of the first resource block. The frequency domain density of the second PTRS is determined by the size of the second resource block. The first reference resource element is determined by the port number of the first DMRS, the resource configuration type of the first DMRS and the like. The second reference resource element is determined by the port number of the second DMRS, the resource configuration type of the second DMRS and the like. The first reference resource block is determined by the frequency domain density of the first PTRS, the size of the first resource block, the radio network temporary identifier and the like. The second reference resource block is determined by the frequency domain density of the second PTRS, the size of the second resource block, the radio network temporary identifier and the like.

The first reference resource block offset and the first reference resource element offset are determined by the first transmission occasion index, the first spatial relationship information and the like. Alternatively, the first reference resource block offset and the first reference resource element offset are determined by the first transmission occasion index, the first PTRS port and the like.

The second reference resource block offset and the second reference resource element offset are determined by the second transmission occasion index, the second spatial relationship information and the like. Alternatively, the second reference resource block offset and the first reference resource element offset are determined by the first transmission occasion index, the second PTRS port and the like.

The frequency domain position of the first PTRS is determined by the frequency domain density of the first PTRS, the first reference resource block, the first reference resource block offset, the first reference resource element offset, the first reference resource element, the resource block index of the first PTRS, the number of subcarriers in each resource block and the like.

The second PTRS frequency domain position is determined by the frequency domain density of the second PTRS, the second reference resource block, the second reference resource block offset, the second reference resource element offset, the second reference resource element, the resource block index of the second PTRS, the number of subcarriers in each resource block and the like.

In one embodiment, the first reference resource block offset, the first reference resource element offset, the second reference resource block offset and the second reference resource element offset are configured in at least one of the following manners: the transmission occasion index is 1, Ref_RB_offset=0 and Ref_RE_offset=0; the transmission occasion index is 2, Ref_RB_offset=0 and Ref_RE_offset=1; the transmission occasion index is 3, Ref_RB_offset=0 and Ref_RE_offset=2; and the transmission occasion index is 4, Ref_RB_offset=0 and Ref_RE_offset=3; or the transmission occasion index is 1, Ref_RB_offset=0 and Ref_RE_offset=0; the transmission occasion index is 2, Ref_RB_offset=0 and Ref_RE_offset=1; the transmission occasion index is 3, Ref_RB_offset=0 and Ref_RE_offset=2; the transmission occasion index is 4, Ref_RB_offset=0 and Ref_RE_offset=3; the transmission occasion index is 5, Ref_RB_offset=1 and Ref_RE_offset=0; the transmission occasion index is 6, Ref_RB_offset=1 and Ref_RE_offset=1; the transmission occasion index is 7, Ref_RB_offset=1 and Ref_RE_offset=2; and the transmission occasion index is 8, Ref_RB_offset=1 and Ref_RE_offset=3.

When the transmission occasion index is an odd number, Ref_RB_offset and Ref_RE_offset denote the first reference resource block offset and the first reference resource element offset respectively; and when the transmission occasion index is an even number, Ref_RB_offset and Ref_RE_offset denote the second reference resource block offset and the second reference resource element offset respectively.

Alternatively, when the transmission occasion index is an odd number, Ref_RB_offset and Ref_RE_offset denote the second reference resource block offset and the second reference resource element offset respectively; and when the transmission occasion index is an even number, Ref_RB_offset and Ref_RE_offset denote the first reference resource block offset and the first reference resource element offset respectively.

Alternatively, for the first half of the transmission occasion index, Ref_RB_offset and Ref_RE_offset denote the first reference resource block offset and the first reference resource element offset respectively; and for the second half of the transmission occasion index, Ref_RB_offset and Ref_RE_offset denote the second reference resource block offset and the second reference resource element offset respectively.

Alternatively, for the first half of the transmission occasion index, Ref_RB_offset and Ref_RE_offset denote the second reference resource block offset and the second reference resource element offset respectively; and for the second half of the transmission occasion index, Ref_RB_offset and Ref_RE_offset denote the first reference resource block offset and the first reference resource element offset respectively.

In one embodiment, the first reference resource block offset and reference resource element offset, and the second reference resource element offset and reference resource element offset are associated with the first spatial relationship information and the second spatial relationship information respectively. The value of SpatialRelationInfor of the first spatial relationship information is 1, representing the first communication node. The value of SpatialRelationInfor of the second spatial relationship information is 2, representing the second communication node. Table 9-1 is a mapping table of the reference resource block offset and the reference resource element offset provided by this example. Table 9-2 is another mapping table of the reference resource block offset and the reference resource element offset provided by this example. Table 9-3 is another mapping table of the reference resource block offset and the reference resource element offset provided by this example. Table 9-4 is another mapping table of the reference resource block offset and the reference resource element offset provided by this example. Table 9-5 is another mapping table of the reference resource block offset and the reference resource element offset provided by this example. Table 9-6 is another mapping table of the reference resource block offset and the reference resource element offset provided by this example. Table 9-7 is another mapping table of the reference resource block offset and the reference resource element offset provided by this example. Table 9-8 is another mapping table of the reference resource block offset and the reference resource element offset provided by this example.

Tables 9-1, 9-2, 9-3 and 9-4 show the mapping relationship between the reference resource block offset, the reference resource element, the transmission occasion index and SpatialRelationInfor. Tables 9-5, 9-6, 9-7 and 9-8 show the mapping relationship between the reference resource block offset, the reference resource element, the transmission occasion index and the PTRS port.

TABLE 9-1

Mapping table of the reference resource block offset and the reference resource element offset

| Spatial-RelationInfor | Transmission occasion Index | Ref_RB_offset | Ref_RE_offset |
|---|---|---|---|
| 1 | 1 | 0 | 0 |
| 1 | 2 | 0 | 1 |
| 2 | 3 | 1 | 0 |
| 2 | 4 | 1 | 1 |

TABLE 9-2

Mapping table of the reference resource block offset and the reference resource element offset

| Spatial-RelationInfor | Transmission occasion Index | Ref_RB_offset | Ref_RE_offset |
|---|---|---|---|
| 1 | 1 | 0 | 0 |
| 2 | 2 | 0 | 1 |
| 1 | 3 | 1 | 0 |
| 2 | 4 | 1 | 1 |

TABLE 9-3

Mapping table of the reference resource block offset and the reference resource element offset

| Spatial-RelationInfor | Transmission occasion Index | Ref_RB_offset | Ref_RE_offset |
|---|---|---|---|
| 1 | 1 | 0 | 0 |
| 1 | 2 | 0 | 1 |
| 1 | 3 | 0 | 2 |
| 1 | 4 | 0 | 3 |
| 2 | 5 | 1 | 0 |
| 2 | 6 | 1 | 1 |
| 2 | 7 | 1 | 2 |
| 2 | 8 | 1 | 3 |

TABLE 9-4

Mapping table of the reference resource block offset and the reference resource element offset

| Spatial-RelationInfor | Transmission occasion Index | Ref_RB_offset | Ref_RE_offset |
|---|---|---|---|
| 1 | 1 | 0 | 0 |
| 2 | 2 | 0 | 1 |
| 1 | 3 | 0 | 2 |
| 2 | 4 | 0 | 3 |
| 1 | 5 | 1 | 0 |
| 2 | 6 | 1 | 1 |
| 1 | 7 | 1 | 2 |
| 2 | 8 | 1 | 3 |

In the case where two PTRS ports are supported, the first PTRS port is associated with the first spatial relationship information, and the second PTRS port is associated with the second spatial relationship information.

In one embodiment, in the case where two PTRS ports are supported, the first reference resource block offset and reference resource element offset, and the second reference resource block offset and reference resource element offset may be associated with the PTRS port 0 and the PTRS port 1 respectively.

TABLE 9-5

Mapping table of the reference resource block offset and the reference resource element offset

| PTRS Port | Transmission occasion Index | Ref_RB_offset | Ref_RE_offset |
|---|---|---|---|
| 0 | 1 | 0 | 0 |
| 0 | 2 | 0 | 1 |
| 1 | 3 | 1 | 0 |
| 1 | 4 | 1 | 1 |

TABLE 9-6

Mapping table of the reference resource block offset and the reference resource element

| PTRS Port | Transmission occasion Index | Ref_RB_offset | Ref_RE_offset |
|---|---|---|---|
| 0 | 1 | 0 | 0 |
| 1 | 2 | 0 | 1 |
| 0 | 3 | 1 | 0 |
| 1 | 4 | 1 | 1 |

TABLE 9-7

Mapping table of the reference resource block offset
and the reference resource element

| PTRS Port | Transmission occasion Index | Ref_RB_offset | Ref_RE_offset |
|---|---|---|---|
| 0 | 1 | 0 | 0 |
| 0 | 2 | 0 | 1 |
| 0 | 3 | 0 | 2 |
| 0 | 4 | 0 | 3 |
| 1 | 5 | 1 | 0 |
| 1 | 6 | 1 | 1 |
| 1 | 7 | 1 | 2 |
| 1 | 8 | 1 | 3 |

TABLE 9-8

Mapping table of the reference resource block offset
and the reference resource element

| PTRS Port | Transmission occasion Index | Ref_RB_offset | Ref_RE_offset |
|---|---|---|---|
| 0 | 1 | 0 | 0 |
| 1 | 2 | 0 | 1 |
| 0 | 3 | 0 | 2 |
| 1 | 4 | 0 | 3 |
| 0 | 5 | 1 | 0 |
| 1 | 6 | 1 | 1 |
| 0 | 7 | 1 | 2 |
| 1 | 8 | 1 | 3 |

In one embodiment, the frequency domain position of the first PTRS and the frequency domain position of the second PTRS may be calculated according to the following formula:

$$k = \text{Ref\_RE} + \text{Ref\_RE\_offset} + (i * \text{K\_PTRS} + \text{Ref\_RB} + \text{Ref\_RB\_offset}) * \text{N\_SC}; \text{ or}$$

$$k = \begin{cases} \text{Ref\_RE} + \text{Ref\_RE\_offset} + (i * \text{K\_PTRS} + \text{Ref\_RB} + \text{Ref\_RB\_offset}) * \text{N\_SC}, \text{ if } A \\ \text{Ref\_RE} + (i * \text{K\_PTRS} + \text{Ref\_RB}) * \text{N\_SC}, \text{ if } B \end{cases}$$

A may denote that the transmission occasion index is not 1. B may denote that the transmission occasion index is 1.

k denotes the PTRS frequency domain position. Ref_RE denotes the reference resource element. K_PTRS denotes the PTRS frequency domain density. Ref_RB denotes the reference resource block. i denotes the directory index of an actually scheduled PTRS in the frequency domain. N_SC denotes the number of subcarriers in each resource block. Ref_RB_offset denotes the reference resource block offset. Ref_RE_offset denotes the reference resource element offset.

Ref_RB_offset and Ref_RE_offset are acquired according to the preceding configuration method.

Figure 2:
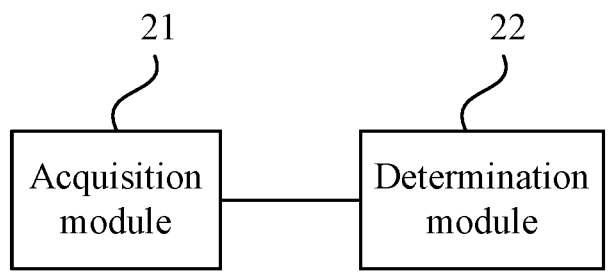
FIG. 2 is a diagram illustrating the structure of a position determination device for a reference signal according to an embodiment of the present application.

The present application further provides a position determination device for a reference signal. FIG. 2 is a diagram illustrating the structure of a position determination device for a reference signal according to an embodiment of the present application. The device may be configured on a communication node. As shown in FIG. 2, the position determination device for a reference signal in this embodiment of the present application includes an acquisition module 21 and a determination module 22. The acquisition module 21 is configured to acquire indication information. The determination module 22 is configured to, according to the indication information and a predefined mapping relationship, determine the frequency domain position of a first PTRS and the frequency domain position of a second PTRS. The predefined mapping relationship indicates a mapping relationship between the indication information and the frequency domain position of the first PTRS and a mapping relationship between the indication information and the frequency domain position of the second PTRS. The frequency domain position of the first PTRS is the frequency domain position of a downlink PTRS indicated by first beam-related information or the frequency domain position of an uplink PTRS indicated by first beam-related information. The frequency domain position of the second PTRS is the frequency domain position of a downlink PTRS indicated by second beam-related information or the frequency domain position of an uplink PTRS indicated by second beam-related information. Beam-related information is a transmission configuration indication or spatial relationship information.

The position determination device for a reference signal provided in this embodiment is configured to perform the position determination method for a reference signal in the embodiment of the present application. The implementation principle and technical effect of the position determination device for a reference signal provided in this embodiment are similar to the implementation principle and technical effect of the position determination method for a reference signal in the embodiment of the present application. Repetition is not made herein.

On the basis of the preceding embodiments, variant embodiments of the preceding embodiment are proposed. It is to be noted here that for ease of description, only differences from the preceding embodiment are described in the variant embodiments.

In one embodiment, the indication information includes one or more of the following: the size of a first resource block, where the size of the first resource block is the size of a downlink scheduled resource block indicated by the first beam-related information or the size of an uplink scheduled resource block of the first communication node; the size of a second resource block, where the size of the second resource block is the size of a downlink scheduled resource block indicated by the second beam-related information or the size of an uplink scheduled resource block indicated by the second beam-related information; the resource block index of a first PTRS, where the resource block index of the first PTRS is the resource block index of a downlink PTRS indicated by the first beam-related information or the resource block index of an uplink PTRS indicated by the first beam-related information; the resource block index of a second PTRS, where the resource block index of the second PTRS is the resource block index of a downlink PTRS indicated by the second beam-related information or the resource block index of an uplink PTRS indicated by the second beam-related information; the port number of a first DMRS, where the port number of the first DMRS is the port number of a downlink DMRS indicated by the first beam-related information or the port number of an uplink DMRS indicated by the first beam-related information; the port number of a second DMRS, where the port number of the second DMRS is the port number of a downlink DMRS indicated by the second beam-related information or the port number of an uplink DMRS indicated by the second beam-related information; the resource configuration type of the first DMRS, where the resource configuration type of the first DMRS is the resource configuration type of a downlink DMRS indicated by the first beam-related information or the resource configuration type of an uplink DMRS indicated by the first beam-related information; the resource configuration type of the second DMRS, where the resource configuration type of a second DMRS is the resource configuration type of a downlink DMRS indicated by the second beam-related information or the resource configuration type of an uplink DMRS indicated by the second beam-related information; the port number of a first PTRS, where the port number of the first PTRS is the port number of a downlink PTRS indicated by the first beam-related information or the port number of an uplink PTRS indicated by the first beam-related information; the port number of a second PTRS, where the port number of the second PTRS is the port number of a downlink PTRS indicated by the second beam-related information or the port number of an uplink PTRS indicated by the second beam-related information; a first transmission configuration indication, where the first transmission configuration indication is determined by an RRC signaling, a MAC-CE signaling or a DCI signaling; a second transmission configuration indication, where the second transmission configuration indication is determined by an RRC signaling, a MAC-CE signaling or a DCI signaling; first spatial relationship information, where the first spatial relationship information is determined by an RRC signaling, a MAC-CE signaling or a DCI signaling; second spatial relationship information, where the second spatial relationship information is determined by an RRC signaling, a MAC-CE signaling or a DCI signaling; a radio network temporary identifier; and the number of subcarriers in each resource block.

In one embodiment, the indication information includes the size of a precoding resource block group.

In one embodiment, the indication information includes one or more of a first transmission occasion index and a second transmission occasion index.

The first transmission occasion index is the transmission occasion index of a PDSCH indicated by the first beam-related information or the transmission occasion index of a PUSCH indicated by the first beam-related information. The second transmission occasion index is the transmission occasion index of a PDSCH indicated by the second beam-related information or the transmission occasion index of a PUSCH indicated by the second beam-related information.

In one embodiment, the predefined mapping relationship includes one or more of the following: the mapping relationship between the PTRS frequency domain density and the size of a scheduled resource block; the mapping relationship between the port number of a DMRS, the resource configuration type of a DMRS and the reference resource element; the mapping relationship between the PTRS frequency domain density, the size of a scheduled resource block, the radio network temporary identifier and the reference resource block; and the mapping relationship between the PTRS port and the beam-related information.

In one embodiment, the predefined mapping relationship includes the mapping relationship between the reference resource element, the reference resource block, the PTRS frequency domain density, the resource block index of a PTRS, the number of subcarriers in each resource block and the PTRS frequency domain position.

In one embodiment, the predefined mapping relationship includes one or more of the following: the mapping relationship between the transmission configuration indication, the PTRS frequency domain density, the size of a precoding resource block group and the reference resource block offset; and the mapping relationship between the PTRS port, the PTRS frequency domain density, the size of a precoding resource block group and the reference resource block offset.

In one embodiment, the predefined mapping relationship includes the mapping relationship between the reference resource block offset, the reference resource element, the reference resource block, the PTRS frequency domain density, the resource block index of a PTRS, the number of subcarriers in each resource block and the PTRS frequency domain position.

In one embodiment, the predefined mapping relationship includes one or more of the following: the mapping relationship between the transmission occasion index, the transmission configuration indication and the reference resource block offset; and the mapping relationship between the transmission occasion index, the PTRS port and the reference resource block offset.

In one embodiment, the predefined mapping relationship includes one or more of the following: the mapping relationship between the transmission occasion index, the transmission configuration indication and the reference resource element offset; and the mapping relationship between the transmission occasion index, the PTRS port and the reference resource element offset.

In one embodiment, the predefined mapping relationship includes the mapping relationship between the reference resource element offset, the reference resource element, the reference resource block, the PTRS frequency domain density, the resource block index of a PTRS, the number of subcarriers in each resource block and the PTRS frequency domain position.

In one embodiment, the predefined mapping relationship includes one or more of the following: the mapping relationship between the transmission occasion index, the transmission configuration indication, the reference resource block offset and the reference resource element offset; the mapping relationship between the transmission occasion index, the PTRS port, the reference resource block offset and the reference resource element offset; and the mapping relationship between the reference resource element offset, the reference resource block offset, the reference resource element, the reference resource block, the PTRS frequency domain density, the resource block index of a PTRS, the number of subcarriers in each resource block and the PTRS frequency domain position.

In one embodiment, the device includes one or more of the following: the frequency domain density of the first PTRS is determined by the size of the first resource block, where the frequency domain density of the first PTRS is the frequency domain density of a downlink PTRS indicated by the first beam-related information or the frequency domain density of an uplink PTRS indicated by the first beam-related information; the frequency domain density of the second PTRS is determined by the size of the second resource block, where the frequency domain density of the second PTRS is the frequency domain density of a downlink PTRS indicated by the second beam-related information or the frequency domain density of an uplink PTRS indicated by the second beam-related information; the first reference resource element is determined by the port number of the first DMRS and the resource configuration type of the first DMRS, where the first reference resource element is the reference resource element of a downlink PTRS indicated by the first beam-related information or the reference resource element of an uplink PTRS indicated by the first beam-related information; the second reference resource element is determined by the port number of the second DMRS and the resource configuration type of the second DMRS, where the second reference resource element is the reference resource element of a downlink PTRS indicated by the second beam-related information or the reference resource element of an uplink PTRS indicated by the second beam-related information; the first reference resource block is determined by the frequency domain density of the first PTRS, the size of the first resource block and the radio network temporary identifier, where the first reference resource block is the reference resource block of a downlink PTRS indicated by the first beam-related information or the reference resource block of an uplink PTRS indicated by the first beam-related information; and the second reference resource block is determined by the frequency domain density of the second PTRS, the size of the second resource block and the radio network temporary identifier, where the second reference resource block is the reference resource block of a downlink PTRS indicated by the second beam-related information or the reference resource block of an uplink PTRS indicated by the second beam-related information.

In one embodiment, the device includes one or more of the following: the frequency domain position of the first PTRS is determined by the frequency domain density of the first PTRS, the first reference resource block, the first reference resource element, the resource block index of the first PTRS and the number of subcarriers in each resource block; and the frequency domain position of the second PTRS is determined by the frequency domain density of the second PTRS, the second reference resource block, the second reference resource element, the resource block index of the second PTRS and the number of subcarriers in each resource block.

In one embodiment, the device includes one or more of the following: the first reference resource block offset is determined by the first transmission occasion index and the first transmission configuration indication, where the first reference resource block offset is the reference resource block offset of a downlink PTRS indicated by the first beam-related information or the reference resource block offset of an uplink PTRS indicated by the first beam-related information; the first reference resource block offset is determined by the first transmission occasion index and the port number of the first PTRS; the second reference resource block offset is determined by the second transmission occasion index and the second transmission configuration indication, where the second reference resource block offset is the reference resource block offset of a downlink PTRS indicated by the second beam-related information or the reference resource block offset of an uplink PTRS indicated by the second beam-related information; the second reference resource block offset is determined by the first transmission occasion index and the port number of the second PTRS; the frequency domain position of the first PTRS is determined by the frequency domain density of the first PTRS, the first reference resource block, the first reference resource block offset, the first reference resource element, the resource block index of the first PTRS and the number of subcarriers in each resource block; and the frequency domain position of the second PTRS is determined by the frequency domain density of the second PTRS, the second reference resource block, the second reference resource block offset, the second reference resource element, the resource block index of the second PTRS and the number of subcarriers in each resource block.

In one embodiment, the device includes one or more of the following: the first reference resource element offset is determined by the first transmission occasion index and the first transmission configuration indication; the first reference resource element offset is determined by the first transmission occasion index and the port number of the first PTRS; the second reference resource element offset is determined by the second transmission occasion index and the second transmission configuration indication; the second reference resource element offset is determined by the first transmission occasion index and the port number of the second PTRS; the frequency domain position of the first PTRS is determined by the frequency domain density of the first PTRS, the first reference resource block, the first reference resource element offset, the first reference resource element, the resource block index of the first PTRS and the number of subcarriers in each resource block; and the frequency domain position of the second PTRS is determined by the frequency domain density of the second PTRS, the second reference resource block, the second reference resource element offset, the second reference resource element, the resource block index of the second PTRS and the number of subcarriers in each resource block.

In one embodiment, the device includes one or more of the following: the first reference resource block offset and the first reference resource element offset are determined by the first transmission occasion index and the first transmission configuration indication; the first reference resource block offset and the first reference resource element offset are determined by the first transmission occasion index and the port number of the first PTRS; the second reference resource block offset and the second reference resource element offset are determined by the second transmission occasion index and the second transmission configuration indication; the second reference resource block offset and the second reference resource element offset are determined by the first transmission occasion index and the port number of the second PTRS; the frequency domain position of the first PTRS is determined by the frequency domain density of the first PTRS, the first reference resource block, the first reference resource block offset, the first reference resource element offset, the first reference resource element, the resource block index of the first PTRS and the number of subcarriers in each resource block; and the frequency domain position of the second PTRS is determined by the frequency domain density of the second PTRS, the second reference resource block, the second reference resource block offset, the second reference resource element offset, the second reference resource element, the resource block index of the second PTRS and the number of subcarriers in each resource block.

In one embodiment, the device includes one or more of the following: the frequency domain density of the first PTRS and the frequency domain density of the second PTRS are determined by the sum of the size of the first resource block and the size of the second resource block; the first reference resource element and the second reference resource element are determined by the port number of the first DMRS and the resource configuration type of the first DMRS; the first reference resource element and the second reference resource element are determined by the port number of the second DMRS and the resource configuration type of the second DMRS; the first reference resource element and the second reference resource element are determined by the port number and the resource configuration type of the DMRS of a communication node whose scheduled resource block is smaller among the first communication node and the second communication node; the first reference resource element and the second reference resource element are determined by the port number and the resource configuration type of the DMRS of a communication node whose scheduled resource block is larger among the first communication node and the second communication node; the first reference resource block and the second reference resource block are determined by the frequency domain density of the first PTRS, the size of the first resource block and the radio network temporary identifier; the first reference resource block and the second reference resource block are determined by the frequency domain density of the first PTRS, the size of the second resource block and the radio network temporary identifier; the first reference resource block and the second reference resource block are determined by the frequency domain density of the first PTRS, the size of a resource block whose scheduled resource block is larger in the first communication node and the second communication node and the radio network temporary identifier; the first reference resource block and the second reference resource block are determined by the frequency domain density of the first PTRS, the size of a resource block whose scheduled resource block is smaller in the first communication node and the second communication node and the radio network temporary identifier; the first reference resource block offset is determined by the size of a precoding resource block group, the frequency domain density of the first PTRS and the first transmission configuration indication; the first reference resource block offset is determined by the port number of the first PTRS, the frequency domain density of the first PTRS and the size of a precoding resource block group; the second reference resource block offset is determined by the size of a precoding resource block group, the frequency domain density of the second PTRS and the second transmission configuration indication; the second reference resource block offset is determined by the port number of the second PTRS, the frequency domain density of the second PTRS and the size of a precoding resource block group; the frequency domain position of the first PTRS is determined by the frequency domain density of the first PTRS, the first reference resource block, the first reference resource block offset, the first reference resource element, the resource block index of the first PTRS and the number of subcarriers in each resource block; and the frequency domain position of the second PTRS is determined by the frequency domain density of the second PTRS, the second reference resource block, the second reference resource block offset, the second reference resource element, the resource block index of the second PTRS and the number of subcarriers in each resource block.

In one embodiment, the predefined mapping relationship includes one or more of the following: the mapping relationship between the size of a precoding resource block group, the PTRS frequency domain density, the spatial relationship information and the reference resource block offset; and the mapping relationship between the size of a precoding resource block group, the PTRS frequency domain density, the PTRS port and the reference resource block offset.

In one embodiment, the predefined mapping relationship includes one or more of the following: the mapping relationship between the transmission occasion index, the spatial relationship information and the reference resource block offset; and the mapping relationship between the transmission occasion index, the PTRS port and the reference resource block offset.

In one embodiment, the predefined mapping relationship includes one or more of the following: the mapping relationship between the transmission occasion index, the spatial relationship information and the reference resource element offset; and the mapping relationship between the transmission occasion index, the PTRS port and the reference resource element offset.

In one embodiment, the predefined mapping relationship includes one or more of the following: the mapping relationship between the transmission occasion index, the spatial relationship information, the reference resource block offset and the reference resource element offset; and the mapping relationship between the transmission occasion index, the PTRS port, the reference resource block offset and the reference resource element offset.

In one embodiment, the device includes one or more of the following: the first reference resource block offset is determined by the size of a precoding resource block group, the frequency domain density of the first PTRS and the first spatial relationship information; the first reference resource block offset is determined by the size of a precoding resource block group, the frequency domain density of the first PTRS and the port number of the first DMRS; the second reference resource block offset is determined by the size of a precoding resource block group, the frequency domain density of the second PTRS and the second spatial relationship information; and the second reference resource block offset is determined by the size of a precoding resource block group, the frequency domain density of the second PTRS and the port number of the second DMRS.

In one embodiment, the device includes one or more of the following: the first reference resource block offset is determined by the first transmission occasion index and the first spatial relationship information; the first reference resource block offset is determined by the first transmission occasion index and the port number of the first PTRS; the second reference resource block offset is determined by the second transmission occasion index and the second spatial relationship information; and the second reference resource block offset is determined by the first transmission occasion index and the port number of the second PTRS.

In one embodiment, the device includes one or more of the following: the first reference resource element offset is determined by the first transmission occasion index and the first spatial relationship information; the first reference resource element offset is determined by the first transmission occasion index and the port number of the first PTRS; the second reference resource element offset is determined by the second transmission occasion index and the second spatial relationship information; and the second reference resource element offset is determined by the first transmission occasion index and the port number of the second PTRS.

In one embodiment, the device includes one or more of the following: the first reference resource block offset and the first reference resource element offset are determined by the first transmission occasion index and the first spatial relationship information; the first reference resource block offset and the first reference resource element offset are determined by the first transmission occasion index and the first PTRS port; the second reference resource block offset and the second reference resource element offset are determined by the second transmission occasion index and the second spatial relationship information; and the second reference resource block offset and the first reference resource element offset are determined by the first transmission occasion index and the second PTRS port.

Figure 3:
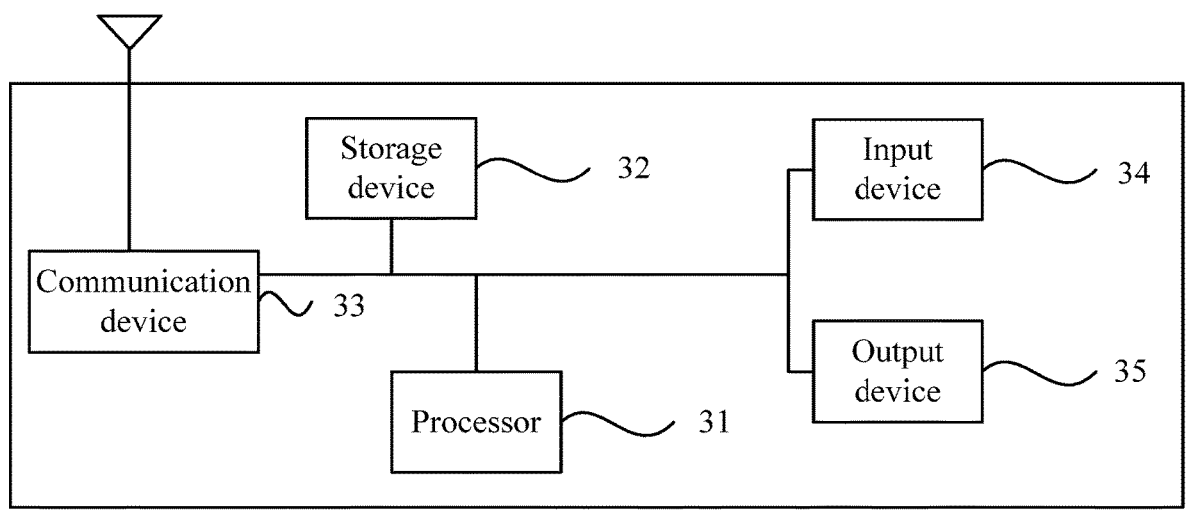
FIG. 3 is a diagram illustrating the structure of a communication node according to an embodiment of the present application.

An embodiment of the present application provides a communication node. FIG. 3 is a diagram illustrating the structure of a communication node according to this embodiment of the present application. As shown in FIG. 3, the communication node provided by the present application includes one or more processors 31 and a storage device 32. One or more processors 31 may be provided in the communication node. In FIG. 3, one processor 31 is used as an example. The storage device 32 is configured to store one or more programs. The one or more programs are executed by the one or more processors 31 to cause the one or more processors 31 to perform the position determination method for a reference signal provided in embodiments of the present application.

The communication node further includes a communication device 33, an input device 34 and an output device 35.

The processor 31, the storage device 32, the communication device 33, the input device 34 and the output device 35 in the communication node may be connected via a bus or other manners, with connection via a bus as an example in FIG. 3.

The input device 34 may be configured to receive input digital or character information and to generate key signal input related to user settings and function control of the communication node. The output device 35 may include display devices such as a display screen.

The communication device 33 may include a receiver and a transmitter. The communication device 33 is configured to perform information transceiving communication under the control of the processor 31. The information includes, but is not limited to, indication information.

As a computer-readable storage medium, the storage device 32 may be configured to store software programs, computer-executable programs and modules such as program instructions/modules (for example, the acquisition module 21 and the determination module 22 in the position determination device for a reference signal) corresponding to the position determination method for a reference signal described in the embodiments of the present application. The storage device 32 may include a program storage area and a data storage area. The program storage area may store an operating system and an application program required by at least one function. The data storage area may store data created depending on use of the communication node. Additionally, the storage device 32 may include a high-speed random-access memory and may further include a nonvolatile memory, such as at least one magnetic disk memory, a flash memory or another nonvolatile solid-state memory. In some examples, the storage device 32 may include memories which are remotely disposed relative to the processor 31, and these remote memories may be connected to the communication node via a network. Examples of the preceding network include, but are not limited to, the Internet, an intranet, a local area network, a mobile communication network and a combination thereof.

An embodiment of the present application further provides a storage medium. The storage medium is configured to store a computer program which, when executed by a processor, performs the position determination method for a reference signal described in any of the embodiments of the present application.

For example, a position determination method for a reference signal includes acquiring indication information; and according to the indication information and a predefined mapping relationship, determining the frequency domain position of a first PTRS and the frequency domain position of a second PTRS. The predefined mapping relationship indicates a mapping relationship between the indication information and the frequency domain position of the first PTRS and a mapping relationship between the indication information and the frequency domain position of the second PTRS.

The frequency domain position of the first PTRS is the frequency domain position of a downlink PTRS indicated by first beam-related information or the frequency domain position of an uplink PTRS indicated by first beam-related information. The frequency domain position of the second PTRS is the frequency domain position of a downlink PTRS indicated by second beam-related information or the frequency domain position of an uplink PTRS indicated by second beam-related information. Beam-related information is a transmission configuration indication or spatial relationship information.

The computer storage medium in embodiments of the present application may use any combination of one or more computer-readable media. A computer-readable medium may be a computer-readable signal medium or a computer-readable storage medium. The computer readable storage medium may be, for example, but is not limited to, an electrical, magnetic, optical, electromagnetic, infrared or semiconductor system, device or component, or any combination thereof. The computer-readable storage medium includes an electrical connection having one or more wires, a portable computer magnetic disk, a hard disk, a random-access memory (RAM), a read-only memory (ROM), an erasable programmable read-only memory (EPROM), a flash memory, an optical fiber, a portable CD-ROM, an optical storage element, a magnetic storage device, or any suitable combination thereof. The computer-readable storage medium may be any tangible medium including or storing a program. The program may be used by or used in conjunction with an instruction execution system, device, or element.

The computer readable signal medium may include a data signal propagating in baseband or as part of a carrier wave. The computer readable signal medium carries computer readable program codes. The data signal propagated in this manner may be in multiple forms and includes, and not limited to, an electromagnetic signal, an optical signal or any suitable combination thereof. The computer-readable signal medium may further be any computer-readable medium other than a computer-readable storage medium. The computer-readable medium may send, propagate or transmit the program used by or used in conjunction with the instruction execution system, device or element.

The program codes contained in the computer-readable medium may be transmitted by using any appropriate medium. The appropriate medium includes, but is not limited to, wireless, a wire, an optical fiber, radio frequency (RF) and the like, or any appropriate combination thereof.

Computer program code for performing the operations of the present application may be written in one or more programming languages or combination thereof, including object-oriented programming languages such as Java, Smalltalk and C++, as well as conventional procedural programming languages such as "C" or similar programming languages. The program codes may be executed entirely on a user computer, partly on the user computer, as a stand-alone software package, partly on the user computer and partly on a remote computer, or entirely on the remote computer or a server. In the case relating to a remote computer, the remote computer may be connected to a user computer via any kind of network including a local area network (LAN) or a wide area network (WAN), or may be connected to an external computer (for example, via the Internet through an Internet service provider).

The above are only exemplary embodiments of the present application and are not intended to limit the scope of the present application.

It is to be understood by those skilled in the art that the term "terminal" covers any suitable type of radio UE, for example, a mobile phone, a portable data processing device, a portable web browser or a vehicle-mounted mobile station.

In general, multiple embodiments of the present application may be performed in hardware, a dedicated circuit, software, logic or any combination thereof. For example, some aspects may be performed in hardware while other aspects may be performed in firmware or software that may be performed by a controller, a microprocessor or other computing devices, though the present application is not limited thereto.

The embodiments of the present application may be performed by computer program instructions executed by a data processor of a mobile device, for example, in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

The block diagrams of any logic flows in the drawings of the present application may represent program steps, or may represent interconnected logic circuits, modules and functions, or may represent a combination of program steps and logic circuits, and modules and functions. The computer program may be stored in a memory. The memory may be of any type suitable to the local technical environment and may be performed using any suitable data storage technology such as, but not limited to, a read-only memory (ROM), a random-access memory (RAM), an optical memory device and system (a digital video disc (DVD) or a compact disc (CD)) and the like. The computer-readable medium may include a non-transitory storage medium. The data processor may be of any type suitable for the local technical environment, such as, but not limited to, a general-purpose computer, a special-purpose computer, a microprocessor, a digital signal processor (DSP), an application specific integrated circuit (ASIC), a field-programmable gate array (FPGA) and a processor based on a multi-core processor architecture.

To sum up, this application includes at least the following items:

1. A position determination method for a reference signal, including:
   acquiring indication information; and
   determining a frequency domain position of a first PTRS and a frequency domain position of a second PTRS according to the indication information and a predefined mapping relationship, where the predefined mapping relationship indicates a mapping relationship between the indication information and the frequency domain position of the first PTRS and a mapping relationship between the indication information and the frequency domain position of the second PTRS,
   where the frequency domain position of the first PTRS is the frequency domain position of a downlink PTRS indicated by first beam-related information or a frequency domain position of an uplink PTRS indicated by first beam-related information; the frequency domain position of the second PTRS is a frequency domain position of a downlink PTRS indicated by second beam-related information or a frequency domain position of an uplink PTRS indicated by second beam-related information; and beam-related information is transmission configuration indication or spatial relationship information.

2. The method according to item 1, where the indication information includes one or more of the following:
   the size of a first resource block, where the size of the first resource block is the size of a downlink scheduled resource block indicated by the first beam-related information or the size of an uplink scheduled resource block indicated by the first beam-related information;
   the size of a second resource block, where the size of the second resource block is the size of a downlink scheduled resource block indicated by the second beam-related information or the size of an uplink scheduled resource block indicated by the second beam-related information;
   the resource block index of the first PTRS, where the resource block index of the first PTRS is the resource block index of a downlink PTRS indicated by the first beam-related information or the resource block index of an uplink PTRS indicated by the first beam-related information;
   the resource block index of the second PTRS, where the resource block index of the second PTRS is the resource block index of a downlink PTRS indicated by the second beam-related information or the resource block index of an uplink PTRS indicated by the second beam-related information;
   the port number of a first DMRS, where the port number of the first DMRS is the port number of a downlink DMRS indicated by the first beam-related information or the port number of an uplink DMRS indicated by the first beam-related information;
   the port number of a second DMRS, where the port number of the second DMRS is the port number of a downlink DMRS indicated by the second beam-related information or the port number of an uplink DMRS indicated by the second beam-related information;
   the resource configuration type of the first DMRS, where the resource configuration type of the first DMRS is the resource configuration type of a downlink DMRS indicated by the first beam-related information or the resource configuration type of an uplink DMRS indicated by the first beam-related information;
   the resource configuration type of the second DMRS, where the resource configuration type of the second DMRS is the resource configuration type of a downlink DMRS indicated by the second beam-related information or the resource configuration type of an uplink DMRS indicated by the second beam-related information;
   the port number of the first PTRS, where the port number of the first PTRS is the port number of a downlink PTRS indicated by the first beam-related information or the port number of an uplink PTRS indicated by the first beam-related information;
   the port number of the second PTRS, where the port number of the second PTRS is the port number of a downlink PTRS indicated by the second beam-related information or the port number of an uplink PTRS indicated by the second beam-related information;
   a first transmission configuration indication, where the first transmission configuration indication is determined by an RRC signaling, a MAC-CE signaling or a DCI signaling;

a second transmission configuration indication, where the second transmission configuration indication is determined by an RRC signaling, a MAC-CE signaling or a DCI signaling;

first spatial relationship information, where the first spatial relationship information is determined by an RRC signaling, a MAC-CE signaling or a DCI signaling;

second spatial relationship information, where the second spatial relationship information is determined by an RRC signaling, a MAC-CE signaling or a DCI signaling;

a radio network temporary identifier; and the number of subcarriers in each resource block.

3. The method according to item 1, where the indication information includes the size of a precoding resource block group.

4. The method according to item 1, where the indication information includes one or more of the following: a first transmission occasion index or a second transmission occasion index, where the first transmission occasion index is the transmission occasion index of a PDSCH indicated by the first beam-related information or the transmission occasion index of a PUSCH indicated by the first beam-related information; and the second transmission occasion index is the transmission occasion index of a PDSCH indicated by the second beam-related information or the transmission occasion index of a PUSCH indicated by the second beam-related information.

5. The method according to item 1, where the predefined mapping relationship includes one or more of the following:

a mapping relationship between a PTRS frequency domain density and the size of a scheduled resource block;

a mapping relationship between the port number of a DMRS, the resource configuration type of the DMRS and a reference resource element;

a mapping relationship between a PTRS frequency domain density, the size of a scheduled resource block, a radio network temporary identifier and a reference resource block; and a mapping relationship between a PTRS port and the beam-related information.

6. The method according to item 1, where the predefined mapping relationship includes:

a mapping relationship between a reference resource element, a reference resource block, a PTRS frequency domain density, a resource block index of a PTRS, the number of subcarriers in each resource block and a PTRS frequency domain position.

7. The method according to item 1, where the predefined mapping relationship includes one or more of the following:

a mapping relationship between a transmission configuration indication, a PTRS frequency domain density, the size of a precoding resource block group and a reference resource block offset; and a mapping relationship between a PTRS port, a PTRS frequency domain density, the size of a precoding resource block group and a reference resource block offset.

8. The method according to item 1, where the predefined mapping relationship includes:

a mapping relationship between a reference resource block offset, a reference resource element, a reference resource block, a PTRS frequency domain density, a resource block index of a PTRS, the number of subcarriers in each resource block and a PTRS frequency domain position.

9. The method according to item 1, where the predefined mapping relationship includes one or more of the following:

a mapping relationship between a transmission occasion index, a transmission configuration indication and a reference resource block offset; and a mapping relationship between a transmission occasion index, a PTRS port and a reference resource block offset.

10. The method according to item 1, where the predefined mapping relationship includes one or more of the following:

a mapping relationship between a transmission occasion index, a transmission configuration indication and a reference resource element offset; and a mapping relationship between a transmission occasion index, a PTRS port and a reference resource element offset.

11. The method according to item 1, where the predefined mapping relationship includes a mapping relationship between a reference resource element offset, a reference resource element, a reference resource block, a PTRS frequency domain density, a resource block index of a PTRS, the number of subcarriers in each resource block and a PTRS frequency domain position.

12. The method according to item 1, where the predefined mapping relationship includes one or more of the following:

a mapping relationship between a transmission occasion index, a transmission configuration indication, a reference resource block offset and a reference resource element offset;

a mapping relationship between a transmission occasion index, a PTRS port, a reference resource block offset and a reference resource element offset; and a mapping relationship between a reference resource element offset, a reference resource block offset, a reference resource element, a reference resource block, a PTRS frequency domain density, a resource block index of a PTRS, the number of subcarriers in each resource block and a PTRS frequency domain position.

13. The method according to item 1, including one or more of the following:

the frequency domain density of the first PTRS is determined by the size of a first resource block, where the frequency domain density of the first PTRS is the frequency domain density of a downlink PTRS indicated by the first beam-related information or the frequency domain density of an uplink PTRS indicated by the first beam-related information;

the frequency domain density of the second PTRS is determined by the size of a second resource block, where the frequency domain density of the second PTRS is the frequency domain density of a downlink PTRS indicated by the second beam-related information or the frequency domain density of an uplink PTRS indicated by the second beam-related information;

a first reference resource element is determined by the port number of a first DMRS and the resource configuration type of the first DMRS, where the first reference resource element is the reference resource element of a downlink PTRS indicated by the first beam-related information or the reference resource element of an uplink PTRS indicated by the first beam-related information;

a second reference resource element is determined by the port number of a second DMRS and the resource configuration type of the second DMRS, where the second reference resource element is the reference resource element of a downlink PTRS indicated by the second beam-related information or the reference resource element of an uplink PTRS indicated by the second beam-related information;

a first reference resource block is determined by the frequency domain density of the first PTRS, the size of a first resource block and a radio network temporary identifier, where the first reference resource block is the reference resource block of a downlink PTRS indicated by the first beam-related information or the reference resource block of an uplink PTRS indicated by the first beam-related information; and a second reference resource block is determined by the frequency domain density of the second PTRS, the size of a second resource block and a radio network temporary identifier, where the second reference resource block is the reference resource block of a downlink PTRS indicated by the second beam-related information or the reference resource block of an uplink PTRS indicated by the second beam-related information.

14. The method according to item 1, including one or more of the following:

the frequency domain position of the first PTRS is determined by the frequency domain density of the first PTRS, a first reference resource block, a first reference resource element, the resource block index of the first PTRS and the number of subcarriers in each resource block; and the frequency domain position of the second PTRS is determined by the frequency domain density of the second PTRS, a second reference resource block, a second reference resource element, the resource block index of the second PTRS and the number of subcarriers in each resource block.

15. The method according to item 1, including one or more of the following:

a first reference resource block offset is determined by a first transmission occasion index and a first transmission configuration indication, where the first reference resource block offset is the reference resource block offset of a downlink PTRS indicated by the first beam-related information or the reference resource block offset of an uplink PTRS indicated by the first beam-related information;

a first reference resource block offset is determined by a first transmission occasion index and the port number of the first PTRS;

a second reference resource block offset is determined by a second transmission occasion index and a second transmission configuration indication, where the second reference resource block offset is the reference resource block offset of a downlink PTRS indicated by the second beam-related information or the reference resource block offset of an uplink PTRS indicated by the second beam-related information;

a second reference resource block offset is determined by a second transmission occasion index and the port number of the second PTRS;

the frequency domain position of the first PTRS is determined by the frequency domain density of the first PTRS, a first reference resource block, a first reference resource block offset, a first reference resource element, the resource block index of the first PTRS and the number of subcarriers in each resource block; and the frequency domain position of the second PTRS is determined by the frequency domain density of the second PTRS, a second reference resource block, a second reference resource block offset, a second reference resource element, the resource block index of the second PTRS and the number of subcarriers in each resource block.

16. The method according to item 1, including one or more of the following:

a first reference resource element offset is determined by a first transmission occasion index and a first transmission configuration indication;

a first reference resource element offset is determined by a first transmission occasion index and the port number of the first PTRS;

a second reference resource element offset is determined by a second transmission occasion index and a second transmission configuration indication;

a second reference resource element offset is determined by a first transmission occasion index and the port number of the second PTRS;

the frequency domain position of the first PTRS is determined by the frequency domain density of the first PTRS, a first reference resource block, a first reference resource element offset, a first reference resource element, the resource block index of the first PTRS and the number of subcarriers in each resource block; and the frequency domain position of the second PTRS is determined by the frequency domain density of the second PTRS, a second reference resource block, a second reference resource element offset, a second reference resource element, the resource block index of the second PTRS and the number of subcarriers in each resource block.

17. The method according to item 1, including one or more of the following:

a first reference resource block offset and a first reference resource element offset are determined by a first transmission occasion index and a first transmission configuration indication;

a first reference resource block offset and a first reference resource element offset are determined by a first transmission occasion index and the port number of the first PTRS;

a second reference resource block offset and a second reference resource element offset are determined by a second transmission occasion index and a second transmission configuration indication;

a second reference resource block offset and a second reference resource element offset are determined by a first transmission occasion index and the port number of the second PTRS;

the frequency domain position of the first PTRS is determined by the frequency domain density of the first PTRS, a first reference resource block, a first reference resource block offset, a first reference resource element offset, a first reference resource element, the resource block index of the first PTRS and the number of subcarriers in each resource block; and the frequency domain position of the second PTRS is determined by the frequency domain density of the second PTRS, a second reference resource block, a second reference resource block offset, a second reference resource element offset, a second reference resource element, the resource block index of the second PTRS and the number of subcarriers in each resource block.

18. The method according to item 1, including one or more of the following:
   the frequency domain density of the first PTRS and the frequency domain density of the second PTRS are determined by the sum of the size of a first resource block and the size of a second resource block;
   a first reference resource element and a second reference resource element are determined by the port number of a first DMRS and the resource configuration type of the first DMRS;
   a first reference resource element and a second reference resource element are determined by the port number of a second DMRS and the resource configuration type of the second DMRS;
   a first reference resource element and a second reference resource element are determined by the port number and the resource configuration type of the DMRS of a communication node whose scheduled resource block is smaller among a first communication node and a second communication node;
   a first reference resource element and a second reference resource element are determined by the port number and the resource configuration type of the DMRS of a communication node whose scheduled resource block is larger among a first communication node and a second communication node;
   a first reference resource block and a second reference resource block are determined by the frequency domain density of the first PTRS, the size of a first resource block and a radio network temporary identifier;
   a first reference resource block and a second reference resource block are determined by the frequency domain density of the first PTRS, the size of a second resource block and a radio network temporary identifier;
   a first reference resource block and a second reference resource block are determined by the frequency domain density of the first PTRS, the size of a larger resource block scheduled by a first communication node and a second communication node and a radio network temporary identifier;
   a first reference resource block and a second reference resource block are determined by the frequency domain density of the first PTRS, the size of a smaller resource block scheduled by a first communication node and a second communication node and a radio network temporary identifier;
   a first reference resource block offset is determined by the size of a precoding resource block group, the frequency domain density of the first PTRS and a first transmission configuration indication;
   a first reference resource block offset is determined by the port number of the first PTRS, the frequency domain density of the first PTRS and the size of a precoding resource block group;
   a second reference resource block offset is determined by the size of a precoding resource block group, the frequency domain density of the second PTRS and a second transmission configuration indication;
   a second reference resource block offset is determined by the port number of the second PTRS, the frequency domain density of the second PTRS and the size of a precoding resource block group;
   the frequency domain position of the first PTRS is determined by the frequency domain density of the first PTRS, a first reference resource block, a first reference resource block offset, a first reference resource element, the resource block index of the first PTRS and the number of subcarriers in each resource block; and
   the frequency domain position of the second PTRS is determined by the frequency domain density of the second PTRS, a second reference resource block, a second reference resource block offset, a second reference resource element, the resource block index of the second PTRS and the number of subcarriers in each resource block.

19. The method according to item 1, where the predefined mapping relationship includes one or more of the following:
   a mapping relationship between the size of a precoding resource block group, a PTRS frequency domain density, the spatial relationship information and a reference resource block offset; and
   a mapping relationship between the size of a precoding resource block group, a PTRS frequency domain density, a PTRS port and a reference resource block offset.

20. The method according to item 1, where the predefined mapping relationship includes one or more of the following:
   a mapping relationship between a transmission occasion index, the spatial relationship information and a reference resource block offset; and
   a mapping relationship between a transmission occasion index, a PTRS port and a reference resource block offset.

21. The method according to item 1, where the predefined mapping relationship includes one or more of the following:
   a mapping relationship between a transmission occasion index, the spatial relationship information and a reference resource element offset; and
   a mapping relationship between a transmission occasion index, a PTRS port and a reference resource element offset.

22. The method according to item 1, where the predefined mapping relationship includes one or more of the following:
   a mapping relationship between a transmission occasion index, the spatial relationship information, a reference resource block offset and a reference resource element offset; and
   a mapping relationship between a transmission occasion index, a PTRS port, a reference resource block offset and a reference resource element offset.

23. The method according to item 1, including one or more of the following:
   a first reference resource block offset is determined by the size of a precoding resource block group, the frequency domain density of the first PTRS and first spatial relationship information;
   a first reference resource block offset is determined by the size of a precoding resource block group, the frequency domain density of the first PTRS and the port number of a first DMRS;
   a second reference resource block offset is determined by the size of a precoding resource block group, the frequency domain density of the second PTRS and second spatial relationship information; and
   a second reference resource block offset is determined by the size of a precoding resource block group, the frequency domain density of the second PTRS and the port number of a second DMRS.

24. The method according to item 1, including one or more of the following:

a first reference resource block offset is determined by a first transmission occasion index and first spatial relationship information;

a first reference resource block offset is determined by a first transmission occasion index and the port number of the first PTRS;

a second reference resource block offset is determined by a second transmission occasion index and second spatial relationship information; and a second reference resource block offset is determined by a second transmission occasion index and the port number of the second PTRS.

25. The method according to item 1, including one or more of the following:

a first reference resource element offset is determined by a first transmission occasion index and first spatial relationship information;

a first reference resource element offset is determined by a first transmission occasion index and the port number of the first PTRS;

a second reference resource element offset is determined by a second transmission occasion index and second spatial relationship information; and a second reference resource element offset is determined by a second transmission occasion index and the port number of the second PTRS.

26. The method according to item 1, including one or more of the following:

a first reference resource block offset and a first reference resource element offset are determined by a first transmission occasion index and first spatial relationship information;

a first reference resource block offset and a first reference resource element offset are determined by a first transmission occasion index and a first PTRS port;

a second reference resource block offset and a second reference resource element offset are determined by a second transmission occasion index and second spatial relationship information; and a second reference resource block offset and a first reference resource element offset are determined by a first transmission occasion index and a second PTRS port.

27. A position determination device for a reference signal, including:

an acquisition module configured to acquire indication information; and a determination module configured to determine the frequency domain position of a first PTRS and the frequency domain position of a second PTRS according to the indication information and a predefined mapping relationship, where the predefined mapping relationship indicates a mapping relationship between the indication information and the frequency domain position of the first PTRS and a mapping relationship between the indication information and the frequency domain position of the second PTRS, where the frequency domain position of the first PTRS is the frequency domain position of a downlink PTRS indicated by first beam-related information or the frequency domain position of an uplink PTRS indicated by first beam-related information; the frequency domain position of the second PTRS is the frequency domain position of a downlink PTRS indicated by second beam-related information or the frequency domain position of an uplink PTRS indicated by second beam-related information; and beam-related information is transmission configuration indication or spatial relationship information.

28. A communication node, including:

one or more processors; and a storage device configured to store one or more programs, where when executed by the one or more processors, the one or more programs cause the one or more processors to perform the method according to any one of items 1 to 26.

29. A storage medium storing a computer program, where when the computer program is executed by a processor, the method according to any one of items 1 to 26 is performed.

What is claimed is:

1. A position determination method for a reference signal, comprising:

acquiring indication information; and determining a frequency domain position of a first phase tracking reference signal (PTRS) and a frequency domain position of a second PTRS according to the indication information and a predefined mapping relationship, wherein the predefined mapping relationship indicates a mapping relationship between the indication information and the frequency domain position of the first PTRS and a mapping relationship between the indication information and the frequency domain position of the second PTRS, wherein the frequency domain position of the first PTRS is a frequency domain position of a downlink PTRS indicated by first beam-related information or a frequency domain position of an uplink PTRS indicated by first beam-related information; the frequency domain position of the second PTRS is a frequency domain position of a downlink PTRS indicated by second beam-related information or a frequency domain position of an uplink PTRS indicated by second beam-related information; and beam-related information is transmission configuration indication or spatial relationship information.

2. The method according to claim 1, wherein the indication information comprises at least one of:

a size of a first resource block, wherein the size of the first resource block is a size of a downlink scheduled resource block indicated by the first beam-related information or a size of an uplink scheduled resource block indicated by the first beam-related information;

a size of a second resource block, wherein the size of the second resource block is a size of a downlink scheduled resource block indicated by the second beam-related information or a size of an uplink scheduled resource block indicated by the second beam-related information;

a resource block index of the first PTRS, wherein the resource block index of the first PTRS is a resource block index of a downlink PTRS indicated by the first beam-related information or a resource block index of an uplink PTRS indicated by the first beam-related information;

a resource block index of the second PTRS, wherein the resource block index of the second PTRS is a resource block index of a downlink PTRS indicated by the second beam-related information or a resource block index of an uplink PTRS indicated by the second beam-related information;

a port number of a first demodulation reference signal (DMRS), wherein the port number of the first DMRS is a port number of a downlink DMRS indicated by the first beam-related information or a port number of an uplink DMRS indicated by the first beam-related information;

a port number of a second DMRS, wherein the port number of the second DMRS is a port number of a downlink DMRS indicated by the second beam-related information or a port number of an uplink DMRS indicated by the second beam-related information;

a resource configuration type of the first DMRS, wherein the resource configuration type of the first DMRS is a resource configuration type of a downlink DMRS indicated by the first beam-related information or a resource configuration type of an uplink DMRS indicated by the first beam-related information;

a resource configuration type of the second DMRS, wherein the resource configuration type of the second DMRS is a resource configuration type of a downlink DMRS indicated by the second beam-related information or a resource configuration type of an uplink DMRS indicated by the second beam-related information;

a port number of the first PTRS, wherein the port number of the first PTRS is a port number of a downlink PTRS indicated by the first beam-related information or a port number of an uplink PTRS indicated by the first beam-related information;

a port number of the second PTRS, wherein the port number of the second PTRS is a port number of a downlink PTRS indicated by the second beam-related information or a port number of an uplink PTRS indicated by the second beam-related information;

a first transmission configuration indication, wherein the first transmission configuration indication is determined by a radio resource control (RRC) signaling, a media access control-control element (MAC-CE) signaling or a downlink control information (DCI) signaling;

a second transmission configuration indication, wherein the second transmission configuration indication is determined by an RRC signaling, a MAC-CE signaling or a DCI signaling;

first spatial relationship information, wherein the first spatial relationship information is determined by an RRC signaling, a MAC-CE signaling or a DCI signaling;

second spatial relationship information, wherein the second spatial relationship information is determined by an RRC signaling, a MAC-CE signaling or a DCI signaling;

a radio network temporary identifier; or a number of subcarriers in each resource block.

3. The method according to claim 1, wherein the indication information comprises a size of a precoding resource block group.

4. The method according to claim 1, wherein the indication information comprises at least one of: a first transmission occasion index or a second transmission occasion index, wherein the first transmission occasion index is a transmission occasion index of a physical downlink shared channel (PDSCH) indicated by the first beam-related information or a transmission occasion index of a physical uplink shared channel (PUSCH) indicated by the first beam-related information; and the second transmission occasion index is a transmission occasion index of a PDSCH indicated by the second beam-related information or a transmission occasion index of a PUSCH indicated by the second beam-related information.

5. The method according to claim 1, wherein the predefined mapping relationship comprises at least one of:
 a mapping relationship between a PTRS frequency domain density and a size of a scheduled resource block;
 a mapping relationship between a port number of a DMRS, a resource configuration type of the DMRS and a reference resource element;
 a mapping relationship between a PTRS frequency domain density, a size of a scheduled resource block, a radio network temporary identifier and a reference resource block; or
 a mapping relationship between a PTRS port and beam-related information.

6. The method according to claim 1, wherein the predefined mapping relationship comprises:
 a mapping relationship between a reference resource element, a reference resource block, a PTRS frequency domain density, a resource block index of a PTRS, a number of subcarriers in each resource block and a PTRS frequency domain position.

7. The method according to claim 1, wherein the predefined mapping relationship comprises at least one of the following:
 a mapping relationship between a transmission configuration indication, a PTRS frequency domain density, a size of a precoding resource block group and a reference resource block offset; or
 a mapping relationship between a PTRS port, a PTRS frequency domain density, a size of a precoding resource block group and a reference resource block offset.

8. A communication node, comprising:
 at least one processor; and
 a storage device configured to store at least one program, wherein the at least one processor, when executing the at least one program, implements:
 acquiring indication information; and
 determining a frequency domain position of a first phase tracking reference signal (PTRS) and a frequency domain position of a second PTRS according to the indication information and a predefined mapping relationship, wherein the predefined mapping relationship indicates a mapping relationship between the indication information and the frequency domain position of the first PTRS and a mapping relationship between the indication information and the frequency domain position of the second PTRS,
 wherein the frequency domain position of the first PTRS is a frequency domain position of a downlink PTRS indicated by first beam-related information or a frequency domain position of an uplink PTRS indicated by first beam-related information; the frequency domain position of the second PTRS is a frequency domain position of a downlink PTRS indicated by second beam-related information or a frequency domain position of an uplink PTRS indicated by second beam-related information; and beam-related information is transmission configuration indication or spatial relationship information.

9. The communication node according to claim 8, wherein the indication information comprises at least one of:
 a size of a first resource block, wherein the size of the first resource block is a size of a downlink scheduled resource block indicated by the first beam-related information or a size of an uplink scheduled resource block indicated by the first beam-related information;

a size of a second resource block, wherein the size of the second resource block is a size of a downlink scheduled resource block indicated by the second beam-related information or a size of an uplink scheduled resource block indicated by the second beam-related information;

a resource block index of the first PTRS, wherein the resource block index of the first PTRS is a resource block index of a downlink PTRS indicated by the first beam-related information or a resource block index of an uplink PTRS indicated by the first beam-related information;

a resource block index of the second PTRS, wherein the resource block index of the second PTRS is a resource block index of a downlink PTRS indicated by the second beam-related information or a resource block index of an uplink PTRS indicated by the second beam-related information;

a port number of a first demodulation reference signal (DMRS), wherein the port number of the first DMRS is a port number of a downlink DMRS indicated by the first beam-related information or a port number of an uplink DMRS indicated by the first beam-related information;

a port number of a second DMRS, wherein the port number of the second DMRS is a port number of a downlink DMRS indicated by the second beam-related information or a port number of an uplink DMRS indicated by the second beam-related information;

a resource configuration type of the first DMRS, wherein the resource configuration type of the first DMRS is a resource configuration type of a downlink DMRS indicated by the first beam-related information or a resource configuration type of an uplink DMRS indicated by the first beam-related information;

a resource configuration type of the second DMRS, wherein the resource configuration type of the second DMRS is a resource configuration type of a downlink DMRS indicated by the second beam-related information or a resource configuration type of an uplink DMRS indicated by the second beam-related information;

a port number of the first PTRS, wherein the port number of the first PTRS is a port number of a downlink PTRS indicated by the first beam-related information or a port number of an uplink PTRS indicated by the first beam-related information;

a port number of the second PTRS, wherein the port number of the second PTRS is a port number of a downlink PTRS indicated by the second beam-related information or a port number of an uplink PTRS indicated by the second beam-related information;

a first transmission configuration indication, wherein the first transmission configuration indication is determined by a radio resource control (RRC) signaling, a media access control-control element (MAC-CE) signaling or a downlink control information (DCI) signaling;

a second transmission configuration indication, wherein the second transmission configuration indication is determined by an RRC signaling, a MAC-CE signaling or a DCI signaling;

first spatial relationship information, wherein the first spatial relationship information is determined by an RRC signaling, a MAC-CE signaling or a DCI signaling;

second spatial relationship information, wherein the second spatial relationship information is determined by an RRC signaling, a MAC-CE signaling or a DCI signaling;

a radio network temporary identifier; or a number of subcarriers in each resource block.

10. The communication node according to claim 8, wherein the indication information comprises a size of a precoding resource block group.

11. The communication node according to claim 8, wherein the indication information comprises at least one of:
a first transmission occasion index or a second transmission occasion index, wherein
   the first transmission occasion index is a transmission occasion index of a physical downlink shared channel (PDSCH) indicated by the first beam-related information or a transmission occasion index of a physical uplink shared channel (PUSCH) indicated by the first beam-related information; and the second transmission occasion index is a transmission occasion index of a PDSCH indicated by the second beam-related information or a transmission occasion index of a PUSCH indicated by the second beam-related information.

12. The communication node according to claim 8, wherein the predefined mapping relationship comprises at least one of:
   a mapping relationship between a PTRS frequency domain density and a size of a scheduled resource block;
   a mapping relationship between a port number of a DMRS, a resource configuration type of the DMRS and a reference resource element;
   a mapping relationship between a PTRS frequency domain density, a size of a scheduled resource block, a radio network temporary identifier and a reference resource block; or
   a mapping relationship between a PTRS port and beam-related information.

13. The communication node according to claim 8, wherein the predefined mapping relationship comprises:
   a mapping relationship between a reference resource element, a reference resource block, a PTRS frequency domain density, a resource block index of a PTRS, a number of subcarriers in each resource block and a PTRS frequency domain position.

14. A non-transitory computer readable storage medium, storing a computer program, wherein the computer program, when executed by a processor, implements acquiring indication information; and
   determining a frequency domain position of a first phase tracking reference signal (PTRS) and a frequency domain position of a second PTRS according to the indication information and a predefined mapping relationship, wherein the predefined mapping relationship indicates a mapping relationship between the indication information and the frequency domain position of the first PTRS and a mapping relationship between the indication information and the frequency domain position of the second PTRS,
   wherein the frequency domain position of the first PTRS is a frequency domain position of a downlink PTRS indicated by first beam-related information or a frequency domain position of an uplink PTRS indicated by first beam-related information; the frequency domain position of the second PTRS is a frequency domain position of a downlink PTRS indicated by second beam-related information or a frequency domain position of an uplink PTRS indicated by second beam-related information; and beam-related information is transmission configuration indication or spatial relationship information.

15. The non-transitory computer readable storage medium according to claim 14, wherein the predefined mapping relationship comprises at least one of the following:
- a mapping relationship between a transmission configuration indication, a PTRS frequency domain density, a size of a precoding resource block group and a reference resource block offset; or
- a mapping relationship between a PTRS port, a PTRS frequency domain density, a size of a precoding resource block group and a reference resource block offset.

16. The non-transitory computer readable storage medium according to claim 14, wherein the indication information comprises at least one of:
- a size of a first resource block, wherein the size of the first resource block is a size of a downlink scheduled resource block indicated by the first beam-related information or a size of an uplink scheduled resource block indicated by the first beam-related information;
- a size of a second resource block, wherein the size of the second resource block is a size of a downlink scheduled resource block indicated by the second beam-related information or a size of an uplink scheduled resource block indicated by the second beam-related information;
- a resource block index of the first PTRS, wherein the resource block index of the first PTRS is a resource block index of a downlink PTRS indicated by the first beam-related information or a resource block index of an uplink PTRS indicated by the first beam-related information;
- a resource block index of the second PTRS, wherein the resource block index of the second PTRS is a resource block index of a downlink PTRS indicated by the second beam-related information or a resource block index of an uplink PTRS indicated by the second beam-related information;
- a port number of a first demodulation reference signal (DMRS), wherein the port number of the first DMRS is a port number of a downlink DMRS indicated by the first beam-related information or a port number of an uplink DMRS indicated by the first beam-related information;
- a port number of a second DMRS, wherein the port number of the second DMRS is a port number of a downlink DMRS indicated by the second beam-related information or a port number of an uplink DMRS indicated by the second beam-related information;
- a resource configuration type of the first DMRS, wherein the resource configuration type of the first DMRS is a resource configuration type of a downlink DMRS indicated by the first beam-related information or a resource configuration type of an uplink DMRS indicated by the first beam-related information;
- a resource configuration type of the second DMRS, wherein the resource configuration type of the second DMRS is a resource configuration type of a downlink DMRS indicated by the second beam-related information or a resource configuration type of an uplink DMRS indicated by the second beam-related information;
- a port number of the first PTRS, wherein the port number of the first PTRS is a port number of a downlink PTRS indicated by the first beam-related information or a port number of an uplink PTRS indicated by the first beam-related information;
- a port number of the second PTRS, wherein the port number of the second PTRS is a port number of a downlink PTRS indicated by the second beam-related information or a port number of an uplink PTRS indicated by the second beam-related information;
- a first transmission configuration indication, wherein the first transmission configuration indication is determined by a radio resource control (RRC) signaling, a media access control-control element (MAC-CE) signaling or a downlink control information (DCI) signaling;
- a second transmission configuration indication, wherein the second transmission configuration indication is determined by an RRC signaling, a MAC-CE signaling or a DCI signaling;
- first spatial relationship information, wherein the first spatial relationship information is determined by an RRC signaling, a MAC-CE signaling or a DCI signaling;
- second spatial relationship information, wherein the second spatial relationship information is determined by an RRC signaling, a MAC-CE signaling or a DCI signaling;
- a radio network temporary identifier; or
- a number of subcarriers in each resource block.

17. The non-transitory computer readable storage medium according to claim 14, wherein the indication information comprises a size of a precoding resource block group.

18. The non-transitory computer readable storage medium according to claim 14, wherein the indication information comprises at least one of: a first transmission occasion index or a second transmission occasion index, wherein
the first transmission occasion index is a transmission occasion index of a physical downlink shared channel (PDSCH) indicated by the first beam-related information or a transmission occasion index of a physical uplink shared channel (PUSCH) indicated by the first beam-related information; and the second transmission occasion index is a transmission occasion index of a PDSCH indicated by the second beam-related information or a transmission occasion index of a PUSCH indicated by the second beam-related information.

19. The non-transitory computer readable storage medium according to claim 14, wherein the predefined mapping relationship comprises at least one of:
- a mapping relationship between a PTRS frequency domain density and a size of a scheduled resource block;
- a mapping relationship between a port number of a DMRS, a resource configuration type of the DMRS and a reference resource element;
- a mapping relationship between a PTRS frequency domain density, a size of a scheduled resource block, a radio network temporary identifier and a reference resource block; or
- a mapping relationship between a PTRS port and beam-related information.

20. The non-transitory computer readable storage medium according to claim 14, wherein the predefined mapping relationship comprises:

a mapping relationship between a reference resource element, a reference resource block, a PTRS frequency domain density, a resource block index of a PTRS, a number of subcarriers in each resource block and a PTRS frequency domain position.

\* \* \* \* \*